(12) United States Patent
Dridi et al.

(10) Patent No.: US 7,194,174 B2
(45) Date of Patent: Mar. 20, 2007

(54) INTEGRATED PHOTONIC CRYSTAL STRUCTURE AND METHOD OF PRODUCING SAME

(75) Inventors: Kim Hakim Dridi, Vanlose (DK); Kent Erik Mattsson, Virum (DK)

(73) Assignee: Ignis Technologies AS, Horten (NO)

( * ) Notice: Subject to any disclaimer, the term of this patent is extended or adjusted under 35 U.S.C. 154(b) by 41 days.

(21) Appl. No.: 10/492,644

(22) PCT Filed: Oct. 21, 2002

(86) PCT No.: PCT/DK02/00700

§ 371 (c)(1), (2), (4) Date: Apr. 14, 2004

(87) PCT Pub. No.: WO03/034113

PCT Pub. Date: Apr. 24, 2003

(65) Prior Publication Data

US 2004/0264903 A1   Dec. 30, 2004

Related U.S. Application Data

(60) Provisional application No. 60/387,892, filed on Jun. 13, 2002, provisional application No. 60/330,521, filed on Oct. 24, 2001.

(30) Foreign Application Priority Data

Oct. 19, 2001  (DK) ............................... 2001 01542
Jun. 12, 2002  (DK) ............................... 2002 00891

(51) Int. Cl.
*G02B 6/10* (2006.01)

(52) U.S. Cl. .................. 385/129; 385/43; 385/130; 385/131

(58) Field of Classification Search ............. 385/43, 385/129, 130, 131, 14; 257/14
See application file for complete search history.

(56) References Cited

U.S. PATENT DOCUMENTS 5,172,267 A   12/1992   Yablonovitch (Continued)

FOREIGN PATENT DOCUMENTS

EP   0 953 853 A2   11/1999

(Continued)

OTHER PUBLICATIONS

Hanaizumi O., et al, "Propagation of light Beams Along Line Defects Form in A-SI/SI02 Three-Dimensional Photonic Crystals: Fabrication and Observation", Applied Physics Letters, American Institute of Physics, New York, vol. 74, No. 6, pp. 777-779, Feb. 1999. (Abstract Only).

(Continued)

Primary Examiner—Frank G. Font
Assistant Examiner—Michael P Mooney
(74) Attorney, Agent, or Firm—Jacobson Holman PLLC

(57) ABSTRACT

An integrated photonic crystal (IPC) structure and method of producing the same in which the IPC structure includes a first layered sub-structure with a surface and a one-dimensional periodic refractive index variation along the direction perpendicular to the surface, and a second sub-structure with a plurality of essentially straight identical passages arranged in a two-dimensional periodic pattern cutting through the layered structure at an angle $\alpha$. First and second defects in the first and second sub-structures, respectively, enable electromagnetic modes to be localized in the vicinity of the defects and allow photonic crystal waveguide to be constructed that can control and filter light very efficiently and minimize radiation losses.

34 Claims, 13 Drawing Sheets

U.S. PATENT DOCUMENTS

| | | | |
|---|---|---|---|
| 5,440,421 A | 8/1995 | Fan et al. | |
| 5,608,753 A * | 3/1997 | Paoli et al. | 372/50.1 |
| 5,784,400 A | 7/1998 | Joannopoulos et al. | |
| 5,955,749 A | 9/1999 | Joannopoulos et al. | |
| 6,130,780 A | 10/2000 | Joannopoulos et al. | |
| 6,134,043 A | 10/2000 | Johnson et al. | |
| 6,261,469 B1 | 7/2001 | Zakhidov et al. | |
| 6,310,991 B1 | 10/2001 | Koops et al. | |
| 6,380,551 B2 * | 4/2002 | Abe et al. | 257/15 |
| 6,469,682 B1 | 10/2002 | de Maagt et al. | |
| 2005/0167648 A1 * | 8/2005 | Chang-Hasnain et al. | 257/14 |

FOREIGN PATENT DOCUMENTS

| | | |
|---|---|---|
| EP | 1 052 529 A1 | 11/2000 |
| WO | WO 00/22466 | 4/2000 |

OTHER PUBLICATIONS

Kuramochi E., et al, "A New Fabrication Technique for Photonic Crystals: Nanolithography Combined with Alternating-Layer Deposition", Optical and Quantum Electronics, Chapman and Hall, pp. 53, Jan. 2002. (Abstract Only).

* cited by examiner

INTEGRATED PHOTONIC CRYSTAL STRUCTURE AND METHOD OF PRODUCING SAME

This is a nationalization of PCT/DK02/00700 filed Oct. 21, 2002 and published in English, which was entitled to and claimed the priority of two co-pending U.S. Provisional applications, Ser. No. 60/330,521 filed Oct. 24, 2001, and Ser. No. 60/387,892 filed Jun. 13, 2002.

TECHNICAL FIELD OF THE INVENTION

The invention relates to the field of photonic crystals. In particular, this invention relates to a photonic crystal structure for the transmission/reflection and filtering of electromagnetic waves. Further the invention relates to a photonic crystal structure wherein waveguide cores and/or reflectors are formed.

The invention also concerns a method for the manufacture of integrated photonic crystal structures for the transmission/reflection and filtering of electromagnetic waves.

DESCRIPTION OF RELATED ART

In recent years periodic dielectric media, so called photonic crystals, have drawn a lot of interest in the research community, and many structures have been studied theoretically and experimentally. Photonic crystals allow the propagation of electromagnetic energy to be controlled in otherwise difficult or impossible ways. A periodic medium is said to have a complete photonic band gap (PBG), when it works as a perfect mirror for electromagnetic waves incident from any direction, with any polarisation, within a specified frequency range. Such PBG structures are described in U.S. Pat. No. 6,130,780 entitled "High omni-directional reflectors", and in U.S. Pat. No. 5,440,421 entitled "Three dimensional periodic dielectric structures having photonic band gaps" and in U.S. Pat. No. 5,172,267 entitled "Optical reflector structure, device, method of fabrication, and communications method". Other approaches involve the self-assembling of microstructures as described in U.S. Pat. No. 6,261,469 B1 entitled "Three dimensional periodic structural assemblies on nanometer and longer scales". These types of photonic crystals, if designed for infrared or optical light, are difficult to fabricate, since the spatial periods must be comparable to the wavelength of operation. Most of these require careful alignments of alternating layers made by spatially repeating a complex unit cell of three-dimensional nature or careful alignment of a plurality of holes in a solid body.

The perfect photonic crystal is quite elegant and beautiful, but it becomes ever more useful when a wanted defect is introduced into the crystal structure. By use of such wanted defects resonant cavities and waveguides can be created. However, the introduction of wanted defects into three-dimensional photonic crystals without introducing unwanted defects during processing is difficult. These unwanted defects give rise to serious energy losses for the resonant cavity or waveguide structures. Many manufacturing methods involving advanced lithography and/or self-assembling microstructures are investigated as possible ways of manufacturing photonic crystals. However, the greatest problem and technological challenge in connection with the manufacture of photonic crystals concern the formation of a true three-dimensional structure in an industrial process scale.

One example of how to avoid the complexity of full photonic band gap material and creating wanted defects for producing integrated waveguides is given by U.S. Pat. No. 5,784,400 entitled "Resonant cavities employing two dimensional periodic dielectric materials". Here a planar two-dimensional periodic dielectric structure which results in a photonic band gap and a defect in the periodic dielectric structure are used to produce a two-dimensional confinement of an electromagnetic field. To achieve a true channel waveguide structure vertical confinement is achieved by use of total internal reflection. However, the use of total internal reflection will only enable partial polarisation dependent band gaps, i.e. band gaps for certain discrete directions of propagation for narrow frequency ranges and only for one of the main polarisation states. This will lead to substantial radiation loss in waveguides, waveguide bends, cavities and defects. This structure yields a channel waveguide but is a two-dimensional PBG waveguide with a high index confinement in the third dimension that will not allow for a complete tuning of the characteristics of e.g. both polarisation states nor avoid radiation losses.

A composite photonic crystal structure comprising a guide crystal configured in a lane having a dielectric periodicity in at least a first direction in the plane and barrier crystals configured above and below the guide crystal to confine light within the guide crystal is disclosed in U.S. Pat. No. 6,134,043. Here a composite photonic crystal is obtained through placing adjacent to each other a number of photonic crystal structures. One disadvantage of this is that the realization of this structure will involve advanced and complicated lithography, deposition techniques, and complex three-dimensional alignment for the formation of the individual photonic crystal structures.

A combination of two photonic crystal structures in the combination of nano-lithography with alternating-layer deposition and drilling of holes is known from Kuramochi et al. In "Optical and Quantum Electronics 34: page 53–61, 2002. Here a method for fabricating three-dimensional alternating-layer photonic crystals is presented. First, periodic holes are patterned by use of nano-lithography on a substrate. Then two different dielectric materials are stacked alternately on the substrate by means of bias sputtering. Finally, a two-dimensional array of cylindrical columns is made vertically through the multi-layers. Hereby a structure similar to a diamond lattice structure with a full photonic band gap is made.

The integrated photonic crystal structure that is proposed is a combination of a two-dimensional structure and a Bragg-stack of multi-layers in order to form a three-dimensional photonic crystal with incorporated wanted defects. In the present invention the two-dimensional structure may cut through the Bragg-stack multi-layers at an angle of 90° or less than 90° relative to the tangent plane of the surface of the stack. The latter increases the band gaps of the structure as compared to a structure cut through in a direction perpendicular to the tangent plane of the surface of the stack. Further it will allow for large multidimensional band gaps for one or all of the main polarisation states. With the tangent plane of the surface is meant a plane which includes either the highest or lowest points on the surface when the deviation of the latter from a plane may be represented by a periodic function. Evidently the tangent plane coincides with the surface itself when the surface is planar. The introduction of wanted defects for energy localisation in the above mentioned structure enables a very efficient control of electromagnetic radiation.

In an alternative embodiment of the invention a combination of a three-dimensional structure and a Bragg-stack of multi-layers forms a three-dimensional photonic crystal.

Here pluralities of parallel holes are formed through the multi-layers at angles less than 90° in two directions compared to the tangent plane of the surface.

The control of electromagnetic propagation is thus far better than in the structure proposed in U.S. Pat. No. 5,784,400, because radiation losses can be suppressed to an extreme degree by simply tuning the material and geometric parameters in order to gain high omnidirectional reflectivity. Such high omnidirectional reflectivity has been exploited in U.S. Pat. No. 6,130,780, and in WO 00/22466, but the structure that is proposed in the present invention provides a better confinement of electromagnetic energy, and allows more advanced processing of electromagnetic signals. The structure proposed by Kuramochi et al. also uses high omnidirectional reflectivity of a corrugated alternating-layer photonic crystal structure. This structure requires the formation of nano-lithographic holes in the substrate before deposition of the multi-layer structure and a subsequent alignment of the two-dimensional pattern to be formed through the layered structure. This final alignment is not trivial. Furthermore, the introduction of wanted line defects into this corrugated structure is not trivial either which renders this technique most useful for the creation of defect free photonic crystals without the possibility for efficient localisation of energy.

EP-A-0 953 853 deals with a 'stacked material' exhibiting a photonic band gap. The structure comprises periodically stacked, alternating layers A and B of different refractive indices formed on a substrate C. A 'defect layer' D having a thickness different from layer A or B is inserted in the periodic structure. A plurality of periodically placed holes is formed perpendicular to the stacked structure. A region without holes is included to form a cavity (defect) in the pattern of holes, which fully or partially penetrate the layered structure or only penetrate it inside. The stacked structure is manufactured by substrate bonding methods (involving a.o. sequential, repeated ion-bombardment, thinning and/or polishing processes) to be able to deal with layers of different atomic structures without compromising the inherent atomic structure (e.g. mono-crystalline) of the individual layers. The bonding method requires multiple processing steps and precise alignment techniques.

EP-A-1 052 529 deals with a periodic dielectric structure exhibiting a three dimensional photonic band gap. The structure comprises alternating layers of different refractive indices with a two dimensional periodic array of channels formed perpendicularly to the layers and having a refractive index different from any of the layers. The layers may be made of $Si/SiO_2$, respectively, $GaAs/Al_xGa_{1-x}As$ and the layered structure is made by epitaxial growth, i.e. a growth technique typically used to grow a material on the surface of a single crystal of the same material such that the structure of the grown material exactly follows that of the original material. Epitaxy, a transliteration of two Greek words epi, meaning "upon" and taxis meaning "ordered", is a term applied to processes used to grow a thin crystalline layer usually on a crystalline substrate.

SUMMARY

It is an object of the present invention to provide a new technique for producing three-dimensional photonic crystal structures for effectively reflecting, transmitting, filtering or confining electromagnetic waves, e.g. light. It is a further object to provide a relatively simple method that offers design flexibility and is suited for use in connection with integrated optical components. It is a further object of the present invention to provide a method that is suited for generating substantially planar (possibly corrugated) photonic crystal structures comprising layers having a non-monocrystalline atomic structure. It is a further object of the present invention to provide a method of increasing the band gaps and allowing large multidimensional band gaps for one or all of the main polarisation states, enabling higher omnidirectional reflectivity.

It is a further object of the present invention to provide an integrated photonic crystal structure with a large index contrast that is relatively simple to fabricate and to integrate in the normal production of an optical component.

The objects of the invention are achieved by the invention described in the accompanying claims and as described in the following.

An Integrated Photonic Crystal Structure:

An integrated photonic crystal structure according to the present invention is provided by forming (a) a first layered sub-structure with a surface defining a tangent plane, and a periodic one-dimensional refractive index variation along a direction perpendicular to said tangent plane while the refractive index remains nearly uniform parallel to said surface. The parameters of said first layered sub-structure are chosen such that it enables high omnidirectional reflectivity for electromagnetic radiation having a spectrum of electromagnetic modes incident from a direction perpendicular to the tangent plane of said surface. Further (b) a second sub-structure with a plurality of essentially identical straight parallel passages fully or partly penetrating said first layered sub-structure at an angle α from the direction perpendicular to said tangent plane of said surface and arranged in a two-dimensional periodic pattern. The parameters of said second sub-structure are chosen such that it enables a two-dimensional photonic band gap for propagation of electromagnetic radiation having a spectrum of electromagnetic modes incident from any direction in said tangent plane of said surface. Further, (c) at least one first defect is introduced in said layered structure. This enables an electromagnetic mode to be localised in the vicinity of said first defect, said electromagnetic radiation being confined in the direction perpendicular to said tangent plane of said surface, and/or (d) at least one second defect in said second sub-structure is introduced enabling an electromagnetic mode to be localised in the vicinity of said second defect. The advantage of the defects is that light can be controlled very efficiently and radiation losses can be minimised significantly by exploiting the high omnidirectional reflectivity and the band gaps. The term enable is used (e.g. enable 'a high omnidirectional reflectivity' or 'a two-dimensional band gap') to indicate that structure of the above nature will exhibit the characteristics in question (e.g. 'a high omnidirectional reflectivity' or 'a two-dimensional band gap') when subject to the appropriate electromagnetic radiation. The same is true for the use of 'enable an electromagnetic mode to be localised . . . ', which is equivalent to 'results in an electromagnetic mode localised . . . ', when the structure is subject to the appropriate electromagnetic radiation.

In an aspect of the invention, the first and second defects are entirely absent in the above defined photonic crystal structure to form an optical reflector.

The term 'a first defect' comprises any refractive index change breaking the periodicity of the periodic one-dimensional refractive index variation along a direction perpendicular to the tangent plane of the surface. This includes any intentional refractive index variation within at least one layer of the first layered sub-structure, such as a layer of the same thickness as one of those of the periodic layered structure but having a different refractive index or such a layer of a different thickness than any of those of the periodic layered sub-structure but having the same refractive index as one of those of the periodic layered structure, or such as a layer with a different thickness and a different refractive index than those of the periodic layered structure. It is preferred that the refractive index of a defective layer (first defect) is nearly uniform (i.e. constant within processing tolerances) in a cross section perpendicular to the direction of growth of the layered sub-structure, when the surface is planar or corrugated (but in planar cross sections that lie fully within the corrugated defective layer in question (i.e. below the minima of the 'upper' surface and above the maxima of the 'lower' surface) or alternatively, when the surface is corrugated, on a 'cross sectional surface' following said corrugated surface. Alternatively, a first defect may comprise a variation in the refractive index in a direction parallel to the surface of the first layered structure (e.g. in the form of a cavity or a region within the defective layer having a different refractive index from the rest of the defective layer) or in a direction perpendicular to the tangent plane of the first layered structure (e.g. in the form of the defective layer having an index profile different from a constant in that direction).

The term 'a second defect' is taken to mean any structural or refractive index change breaking the two-dimensional periodicity of the straight passages in a plane parallel to the tangent plane of the surface. The second defect may be formed through a different size, different shape or different refractive index of one or more of said passages (i.e. by filling the one or more passages with a material having a refractive index different from air or from the materials possibly filled into the remaining passages) or by the absence of one or more of said passages in an otherwise periodic pattern of passages.

The term 'straight parallel passages' is in the present context taken to mean that the centre axes of the passages are straight lines which run parallel to each other. This does not preclude that the cross section of a given passage is variable along the centre axis of the passage in question. In an embodiment of the invention, the cross section of one or more and possibly all passages (or pillars, cf. later) vary periodically along their centre axis, e.g. in such a way that it is substantially constant (i.e. constant within processing tolerances) within a given layer, but different for different layer types.

The term "localised in the vicinity of said defect", is in the present context taken to mean that more than 30%, and preferably more than 50% and more preferred more than 80% of the energy of a given mode is confined within the volume constituted by the nearest neighbours to the defect.

In a preferred embodiment, the angle α is larger than zero, such as larger than or equal to 1 degree ($2\pi$ radians equalling 360 degrees), such as larger than 5 degrees. In other preferred embodiments α is smaller than 50 degrees, such as smaller than 30 degrees, such as smaller than 10 degrees. In another preferred embodiment of the invention, the angle α is zero, in other words reflecting the situation where the second sub-structure is perpendicular to the first layered sub-structure. The definition of the angle α is taken to be accurate within the processing tolerances of the manufacturing process.

The parameters of said first layered sub-structure are the number of periodic units that are spatially repeated, the number of layers in a periodic unit, the layer thicknesses, the refractive indices of the layers, the periodicity of the multi-layer stack (the spatial extent of the periodic unit), and the surface topology of said surface relative to the wavelength of the electromagnetic radiation. The parameters of said second sub-structure are the two-dimensional periodic pattern, the lattice constant (i.e. a characteristic pattern spacing), the index contrast between the passages and the first layered sub-structure, and the dimensions of the passages. With "the refractive index remains nearly uniform" and "essentially identical passages", it is understood that the layers and passages are, respectively, essentially uniform and essentially identical within the limits inherently given by process variations in the formation and filling of the layers and the passages. The term 'while the refractive index remains nearly uniform parallel to said surface' is thus taken to mean that the refractive index is assumed to be nearly identical (i.e. constant) along bordering surfaces to neighbouring layers, i.e. constant within processing tolerances in cross sectional surfaces in the layer in question parallel to the plane or possibly corrugated surface of the first layered sub-structure (presumed that no second sub-structure has yet been introduced in the layered structure). For a planar layered structure, this means that the refractive index is nearly uniform in a plane perpendicular to a direction of growth of the layered structure (i.e. parallel to the surfaces between neighbouring layers) in any cross section of the layer in question perpendicular to the surface of the structure (but not necessarily identical from cross section to cross section, if the layer in question has an index profile different from a constant index in a direction perpendicular to the direction of growth of the layered structure). For a layered structure having e.g. a sinusoidal variation of the surface in one direction, this means that the refractive index is nearly uniform on a corresponding sinusoidal surface that is parallel to the surface of the first layered sub-structure. 'The direction of growth' is in the present context taken to mean the direction in which the layers are arranged on top of each other (the term growth does not necessarily imply crystalline growth).

An integrated photonic crystal structure according to the invention provides high omnidirectional reflectivity of electromagnetic radiation and band gaps for some or all polarisation states. The term 'high omnidirectional reflectivity' may in the present context be taken to mean that the reflectivity of electromagnetic radiation in the direction(s) in question is larger than 80%, preferably larger than 95%, such as larger than 99% in all, most or some directions.

High omni-directional reflectivity means that for electromagnetic radiation within a certain spectrum of electromagnetic modes there is high reflectivity for all angles of incidence relative to the tangent plane of said surface of the omni-directional reflector.

In a preferred embodiment of the invention, 'high omni-directional reflectivity' means 100% reflectivity for a certain range of wavelengths and polarization states.

It is anticipated that the surface of the layered sub-structure has a form that allows a tangent plane to be uniquely defined by the possible extrema of the surface. In a preferred embodiment the surface is essentially plane (i.e. plane within processing tolerances), in which case the tangent plane is parallel to the surface. In another preferred embodiment, the surface is periodically varying in one or two dimensions, so that, respectively, lines of minima or an array of minima define a first tangent plane and correspondingly lines or an array of maxima define a second tangent plane, the first and second tangent planes being parallel. It is preferred that the direction of growth of the layers is perpendicular to the tangent plane of the surface of the first layered structure.

The term 'a periodic one-dimensional refractive index' is in the present context taken to mean a refractive index that reflects the structure of the corresponding dielectric layers as defined below in a direction perpendicular to the surface of the layers (in case of essentially plane layers) or perpendicular to a tangent plane to the surface of the layered structure (in case of a corrugated surface) (i.e. the refractive index comprises at least two identical periods when viewed in said one dimension, e.g. perpendicular to the surface or to the tangent plane).

The term 'arranged in a two-dimensional periodic pattern' is in the present context taken to mean that in an arbitrary plane parallel to a tangent plane, the centres of the cross-sections of the 'essentially identical straight parallel passages' in the plane in question constitute a repetitive pattern (i.e. a pattern that may be generated from a 'unit cell' that is translated along the two vectors defining the unit cell).

It is preferred that the layers of the photonic crystal structure are atomically non-crystalline. This has the advantage that the problem of matching of possible differences in the atomic structure of neighbouring layers is minimised or eliminated. The term 'layers that are atomically non-crystalline' is in the present context taken to mean layers having an atomic structure that is not mono-crystalline over the macroscopic extension of the layer, in other words layers which have an atomic structure that is e.g. amorphous (i.e. possessing short and long range atomic disorder) or poly-crystalline (i.e. the layer comprising a multitude of grains, the atoms of each grain sitting on an atomic crystal lattice, the lattice, however, having a different orientation from grain to grain). This has the further advantage of enabling the use of a range of industry scale production techniques such as vapour deposition and sputtering for the formation of the layers.

In a preferred embodiment of the invention, the second sub-structure comprising essentially identical straight parallel passages fully or partially penetrating the first layered sub-structure are formed starting from the surface of the first layered sub-structure. This means that the passages extend from the surface of the first layered sub-structure in a direction towards (and possibly penetrating) a first defect of the first layered sub-structure.

With regard to reducing the radiation loss in the direction perpendicular to said tangent plane, it is an advantage if the one-dimensional periodic refractive index variation along the direction perpendicular to the tangent plane of said surface is configured as a periodic dielectric structure with periodic units each having two or more layers. In an embodiment of the invention, the periodic units of the dielectric structure comprise three or more layers, such as five or more layers. The advantage of this is that radiation loss can be suppressed to an extreme degree by simply tuning the material parameters of the layered structure. In order to reduce the loss and obtain a high reflectivity of the layered structure it is an advantage that the periodic units are repeated at least 2 times. Preferentially, the periodic units are repeated 5 times to increase the reflectivity, and better 10 times. Here a trade off between reflectivity and production feasibility will determine the actual number of periodic units to use.

In a preferred embodiment, at least one periodic unit of layers (i.e. at least two different layers) are arranged on each side of the symmetry breaking (defect) layer. More preferred, more than 2 periodic units and still more preferred more than 5 periodic units of layers are arranged on each side of the defect layer.

In embodiments of the invention one or more of the layers of the periodic units may be specially adapted for adhesive purposes and/or for stress relaxation purposes. In a preferred embodiment, the periodic unit comprises 4 stacked layers A, B, C, D, two layers A and C with different thickness and or refractive index essentially determining the optical properties of the device and two 'intermediate (optionally identical) layers' B and D (B located between A and C and D on top of C) being adapted for providing stress relaxation and/or adherence between the layers A and C of the layered structure.

In an embodiment of the invention, a planar photonic crystal waveguide for the control of electromagnetic waves is provided, the structure comprising:

a) a first layered structure with a surface and a periodic one-dimensional refractive index variation along the direction perpendicular to said surface while remaining nearly uniform along the surface, said layered structure exhibits a photonic band gap for propagation of radiation having a spectrum of electromagnetic modes in any direction perpendicular to the plane of said surface, and b) at least one first defect in said layered structure which results in a electromagnetic mode localised in the vicinity of said first defect, said electromagnetic radiation being vertically confined, and c) a second structure perpendicular to said surface with a plurality of essentially identical straight passages fully or partly penetrating said layered structure arranged in a two-dimensional periodic pattern, said second structure exhibits a two-dimensional photonic band gap for propagation of radiation having a spectrum of electromagnetic modes in any direction in a plane parallel to said surface, and d) at least one second defect in said second structure which results in an electromagnetic mode localised in the vicinity of said second defect.

The term 'vertically confined' is in the present context taken to mean confined in a direction perpendicular to the surface of the layered structure. I.e. 'vertical' is taken to mean in the direction of 'growth' of the layered structure.

With regard to the choice of production technology it is an advantage if said layered sub-structure and/or said first defect comprise materials selected among the group of silicon dioxide, germanium doped silicon dioxide, titanium doped silicon dioxide, silicon oxynitride, silicon nitride, titanium oxide or silicon. These materials make it possible to use well-established processes. These processes for silicon substrates are known from the production of integrated, electronic components and can hereby be used for the manufacture of photonic crystal structures.

It is an advantage if the plurality of passages cut through said first layered sub-structure at an angle α larger than zero and with said surface textured in a shape selected among a plane, a one-dimensional sinusoidal variation or a two-dimensional sinusoidal variation in two different directions. In preferred embodiments, these variations are smooth and hold periods and amplitudes comparable to or shorter than the wavelength of radiation. The advantage with regard to an increase in band gap of an angle α larger than zero is common to all surfaces. By choosing an angle larger than zero the existing band gap will increase as compared with a zero angle. The choice of a surface texture different from a plane increases the band gap and reflectivity, however here a trade off between performance and production feasibility will determine the best choice of surface texture.

It is an advantage if the plurality of passages is filled with a material selected among the group of air, nitrogen, glass, e.g., boron doped silica glass or phosphor doped silica glass. Other materials could as well be used for filling the straight passages. It is, however, required that a large refractive index contrast between the passages and the layered material can be achieved. The contrast in refractive index can preferentially be higher than 0.5, and more advantageously higher than 0.6, and most advantageously higher than 2.4. The index contrast is to be taken between the material in the first layered sub-structure with the lowest refractive index and the refractive index of the material filling the straight passage. A large contrast will facilitate the formation of large photonic band gaps.

In another preferred embodiment one or more of said first defects are combined with one or more of said second defects in order to efficiently allow control of electromagnetic signals in three spatial dimensions.

For efficient coupling of light into/out of the first and/or second defects of the photonic band gap structure, or coupling of light between the mentioned defects and optical fibres or planar waveguides, it is an advantage if an adiabatic taper is formed through some of said defects.

An adiabatic taper may in the present context be implemented as a taper consisting of a number of additional defects (i.e. in addition the first and/or second defects) which gradually change shape and/or position hereby gradually changing the size of the field to be coupled into first and second defects of a planar crystal waveguide or into optical fibres, the additional defects e.g. comprising a plurality of essentially straight passages fully or partly penetrating the layered structure. An adiabatic taper may also in the present context be implemented as one or more defects which gradually spatially change shape and/or position and/or refractive index hereby gradually changing the size of the field and its energy confinement in order to provide a better low loss transfer of energy between the defects and outside waveguides such as optical fibres or other conventional planar waveguides.

It is an advantage that the first or second defect or a region in the vicinity thereof (i.e. e.g. one or more of the closest adjacent neighbouring passages) hosts a non-linear material. A non-linear material is characterised by having a refractive index being a function of the amplitude of the field of radiation transmitted through the material. The advantage of a non-linear material is that it can be used in a vast array of different types of devices, including tuneable filters, optical switches and gates, channel drop filters, and optical interconnects. It is to be understood that any defect in a photonic crystal can be interpreted as a cavity to which light can be coupled, including a hollow space comprising e.g. only air. Such resonant structures can be used in the selection/filtering of individual optical frequencies. Photonic crystals are particularly well suited for use in integrated devices because they have the ability to generate high-Q modes. Hereby only a small frequency modulation is required to shift a mode over its entire width. This sensitive response is extremely important for an all-optical device.

The pattern in which the two-dimensional structure is formed also determines certain properties of the photonic band gaps. A simple structure will lead to a large photonic band gap when a hexagonal structure with a pattern spacing of approximately one half the wavelength of the radiation is formed. It is to be understood that the two-dimensional structure also could be chosen among square, triangular, oblique, primitive rectangular, centred rectangular, honeycomb, and other two-dimensional crystalline structures. All with pattern spacings (lattice constants) that are shorter than the wavelength of the electromagnetic radiation.

By creating channel defects and working in the band gaps of the periodic structures, waveguides can guide electromagnetic radiation along these channels more efficiently because suppression of radiation losses is possible. Hereby very compact waveguides with radii of curvature comparable to the wavelength of light can be designed in a novel way, enabling high-density integrated optics, together with advanced signal processing through wavelength division multiplexing and filtering. One advantageous way of forming such line defects is to use a different size diameter or different refractive index of a line of passages or by the absence of a line of passages. A different size of one or more passages or the absence of one or more of the passages (in an otherwise periodic pattern of passages) will form a resonant cavity. Such resonant structures can be used in the selection/filtering of individual optical frequencies.

An integrated photonic crystal structure according to the invention is alternatively provided by forming the plurality of essentially identical straight parallel passages in a pattern where they touch each other hereby forming a plurality of essentially straight pillars in a two-dimensional periodic pattern. This pillar structure provides high omnidirectional reflectivity of electromagnetic radiation and band gaps for some or all polarisation states. Defects are formed similarly with similar function as in the embodiment of the invention comprising passages.

In a preferred embodiment, a third sub-structure with a plurality of essentially identical straight parallel passages fully or partly penetrating said layered structure at an angle β from the direction perpendicular to said tangent plane of said surface is additionally provided. The third sub-structure shows an angle ϕ to said straight parallel passages of said second sub-structure, and are arranged in a two-dimensional periodic pattern common to both the second and third sub-structure. The second and third sub-structures form a plurality of (optionally intersecting) essentially straight passages fully or partly penetrating the first layered sub-structure. The third sub-structure does as the second sub-structure exhibit a two-dimensional photonic band gap for propagation of radiation having a spectrum of electromagnetic modes in any direction in said tangent plane of said surface.

In a preferred embodiment, the wavelength of the electromagnetic waves is in the range of 190 nm to 11 µm, such as in the range of 250 nm to 3.6 µm, such as in the range of 850 nm to 1800 nm, such as in the range of 1300 nm to 1600 nm.

Alternatively, an integrated photonic crystal structure according to the invention is provided by forming a first sub-structure with a plurality of essentially identical straight parallel pillars formed on a substrate, said substrate defining a tangent plane, said pillars forming an angle α with a direction perpendicular to said tangent plane, said pillars being arranged in a two-dimensional periodic pattern, said first sub-structure exhibiting a two-dimensional photonic band gap for propagation of radiation having a spectrum of electromagnetic modes in any direction in said tangent plane of said surface, wherein said pillars comprise a second layered sub-structure having a periodic one-dimensional refractive index variation along a direction perpendicular to the tangent plane of said surface while the refractive index remains nearly uniform parallel to said surface, said layered structure exhibiting high omnidirectional reflectivity for radiation having a spectrum of electromagnetic modes in a direction perpendicular to said tangent plane of said surface. At least one first defect is introduced in said first substructure which results in an electromagnetic mode localised in the vicinity of said first defect, and/or at least one second defect is introduced in said second layered sub-structure which results in an electromagnetic mode localised in the vicinity of said second defect, said electromagnetic radiation being confined in the direction perpendicular to said tangent plane of said surface.

The above described alternative integrated photonic crystal structures comprising pillars may be implemented and combined with other features of the invention in the same way as the previously described integrated photonic crystal structure comprising passages.

A Planar Photonic Crystal Waveguide Comprising Pillars:

Alternatively, a planar photonic crystal waveguide for the control of electromagnetic waves with a surface is provided by forming a third structure perpendicular to the surface. Here a plurality of essentially identical straight pillars arranged in a two-dimensional periodic pattern exhibits a two-dimensional photonic band gap for propagation of radiation having a spectrum of electromagnetic modes in any direction in the plane of the surface. At least one third defect is introduced in the third structure resulting in an electro-magnetic mode localised in the vicinity of the third defect. This third structure is characterised through the pillars having a one-dimensional periodic refractive index variation along the direction perpendicular to the surface. The layered structure exhibits a photonic band gap for propagation of radiation having a spectrum of electromagnetic modes in any direction perpendicular to the plane of the surface. Furthermore, at least one fourth defect in the layered structure results in an electromagnetic mode localised in the vicinity of the fourth defect. The electromagnetic mode is hereby being vertically confined through the layered structure.

With "essentially identical straight pillars", it is to be understood that the pillars have identical cross sectional geometry in the plane parallel to the surface and this is maintained in the direction perpendicular to the surface, this within the limits inherently given by process variations in the formation and embedding of the pillars.

With "remaining nearly uniform", it is to be understood that the layers are uniform within the limits inherently given by process variations in the formation of the layers. With a "third defect" it is understood any structural or refractive index change breaking the two-dimensional periodicity of the pillars in the plane parallel to the surface. Furthermore it is understood, that the "fourth defect" may be any refractive index change breaking the periodicity of the periodic one-dimensional refractive index variation along the direction perpendicular to the surface. This includes any intentional refractive index variation within at least one layer of the structure within at least one of the pillars.

The advantage of this is that by means of the third and fourth defects in the third and fourth structure light can be controlled very efficiently and radiation losses can be minimised significantly.

With regard to reducing the radiation loss in the vertical plane, it is an advantage if the one-dimensional periodic refractive index variation along the direction perpendicular to the surface is configured as a periodic dielectric structure with periodic units each having two or more layers.

The advantage of this is that radiation loss can be suppressed to an extreme degree by simply tuning the material parameters of the layer structure. In order to reduce the loss and obtain a high reflectivity of the layered structure it is an advantage that the periodic units are repeated at least 2 times. Preferentially the periodic units are repeated 5 times to increase the reflectivity and better 10 times. Here a trade off between reflectivity and production feasibility will determine the actual number of periodic units to use.

It is an advantage if the pillars are surrounded by a material selected among the group of air, nitrogen, glass, e.g. boron doped silica glass or phosphor doped silica glass. As mentioned under previous aspects of this invention other materials could be used. Again it is, however, required that a large refractive index contrast between the pillars and the layered material can be achieved. This to facilitate the formation of large photonic band gaps for propagation of radiation having a spectrum of electromagnetic modes in any direction in the plane of the surface.

It is an advantage that the third and fourth defects comprise a non-linear material. A non-linear material is characterised through a refractive index being a function of the amplitude of the field of radiation transmitted through the material. The third or fourth defects may advantageously comprise a cavity. The advantages of a non-linear material and the introduction of a cavity is described in connection with the first and second defects of the previously described structure with passages.

The pattern in which the two-dimensional structure is formed also determines certain properties of the photonic band gaps. As described during previous aspects of the invention, a large photonic band gap can be obtained when choosing a hexagonal structure with a pattern spacing of approximately one half wavelength of the electromagnetic radiation.

One advantageous way of forming a third defect is through a different size diameter in at least one pillar or by the absence of a pillar. Furthermore, a different size of one or more pillars or the absence of one or more pillars will form one or more resonant cavities. Such resonant structures can be used in the selection/filtering of individual optical frequencies.

With regard to the choice of production technology, it is an advantage if the layers of the periodic units comprise layers of silicon and silicon dioxide, silicon nitride or titanium oxide. Furthermore, the choice of a fourth defect made of silicon dioxide, germanium doped silicon dioxide, titanium doped silicon dioxide, silicon oxy-nitride, silicon nitride, titanium oxide or silicon makes it possible to use well-established processes. These processes for silicon substrates known from the production of integrated, electronic components can hereby be used for the manufacture of the planar photonic crystal waveguide.

The above described alternative integrated photonic crystal structures comprising pillars may be implemented and combined with other features of the invention in the same way as the previously described integrated photonic crystal structure comprising passages.

A Method of Manufacturing an Integrated Photonic Crystal Structure:

As mentioned, the invention also concerns a method of manufacturing an integrated photonic crystal. The method allows the formation of an integrated photonic crystal structure and a planar photonic crystal waveguide as described above. This method is characterised in that it comprises the following steps:
   a) providing a substrate material,
   b) providing said substrate with a specific surface topology
   c) optionally exposing the substrate to a thermal oxidation, d) forming first alternating layers
e) optionally forming a first defect
f) forming second alternating layers
g) applying an etching mask to the top of said second alternating layers and etching passages fully or partially through the formed layered structure under an angle α by anisotropic etching such as Reactive Ion Etching or Reactive Ion Sputtering or Reactive Ion Beam Etching.

In a preferred embodiment of the invention, the passages provided by step g) are formed in the direction of growth (i.e. α=0) of the layers by a reactive ion etching technique. An example of such reactive ion etching technique e.g. Reactive Ion Etching (RIE) also known as reactive sputter etching (RSE) is described in S. M. Sze, "VLSI Technology", Second edition McGraw-Hill Book Company, (1988) page 213–214 and page 396–397 which is incorporated herein by reference.

In other preferred embodiments of the invention, the passages provided by step g) are formed at an angle α (α>0) to the direction of growth of the layers by an anisotropic etching technique such as reactive ion beam etching or reactive ion beam sputtering. An example of such reactive ion etching technique e.g. Reactive Ion Beam Etching (RIBE) is described in S. M. Sze, "VLSI Technology", Second edition McGraw-Hill Book Company, (1988) page 215–216, which is incorporated herein by reference.

The substrate of step a) can be either a flat silicon wafer substrate or silicon substrate with a one- or two-dimensional corrugated surface created by applying a mask and etching the pattern into the silicon substrate (in both cases constituting steps a) and b)). In step a) of the method, the substrate material can advantageously be replaced by a glass substrate. By glass substrate is to be understood quartz, sodium containing silica glass and other silica based glasses. By choice of a glass substrate the thermal oxidation in step c) can be omitted. The choice of substrate material is, however, largely dependent on the actual process choices. Other possible substrate materials could be sapphire or semiconductor material such as GaAs or InP. Application of photolithography with mask contact requires that the substrates are flat. For other topologies a projection lithographic process will be required. The techniques of photolithography and etching are described in further detail in S. M. Sze, "VLSI Technology", second edition McGraw-Hill Book Company, (1988). The photolithography is described in chapter 4, whereas the etching techniques are described in chapter 5, which is incorporated herein by reference.

In a preferred embodiment of the invention, the substrate in step a) is planar in which case step b) reduces to a cleaning or polishing process step.

A first defect of step e) may be formed by a layer having a different thickness and/or a different refractive index than any of the first and second alternating layers of steps d) and f)

By omitting step e), a structure without a defect layer may be provided. By applying an etching mask in step g) without any defects (i.e. comprising a periodic two-dimensional pattern of features without any deviations from periodicity), a structure without defects in the two dimensional pattern of straight passages formed by the etching process is provided. By omitting step e) and applying en etching mask in step g) without any defects, a structure without defects is provided to form an optical reflector.

By applying an etching mask in step g) comprising a periodic two-dimensional pattern of features wherein an area deviating from the periodicity is included, a defect in the pattern of straight passages is introduced.

An advantage of the method according to the invention is that a waveguide or component will be formed in a single etching process after the end of the growth process and this hereby simplifies the fabrication of a three dimensional photonic crystal waveguide or component. However, the formation of a structure in accordance with one preferred embodiment of the present invention, two etching processes will be required at the end of the growth process, to form the two sets of essentially straight passages in two distinct directions through the layered structure.

Another advantage is that the method eliminates the need for complex alignment and multiple intermediate processing steps between features of the individual layers.

Another advantage of the method of the present invention is that it avoids lengthy and handling-critical processes such as polishing or thinning after the application of each layer. Another advantage is that the method consists of steps that are conventional in the production of integrated optical circuits and therefore well-suited for integration in such a process making possible the integration of devices according to the present invention on a chip together with other optical, electrical or electro-optical components.

It is preferred that the layers are made by a deposition technique such as vapour deposition or sputtering. These techniques have the advantages of being well known and documented tools of the semiconductor industry and of being relatively easily adapted to a wide variety of choices of layer materials, thicknesses, dopants, etc. and at the same time being relatively simple, providing fast turnaround times and being economic in use. Such techniques are well-suited for providing layers of the photonic crystal structure that are atomically non-crystalline. The use of non-crystalline layers has the advantage that the problem of matching of possible differences in the atomic structure of neighbouring layers is eliminated.

The technique of vapour deposition (Plasma Enhanced Chemical Vapor Deposition PECVD also known as Plasma CVD, PCVD and Low Pressure Chemical Vapour Deposition LPCVD) are described in further detail in Hiroshi Nishihara, Masamitsu Haruna and Toshiaki Suhara "Optical integrated circuits", McGraw-Hill Book Company, (1989), which is incorporated herein by reference. On page 165, the deposition of silicon nitride films by various CVD techniques is described. Page 151 describes the deposition of silica based glass by use of an atmospheric pressure CVD method, whereas page 149–151 describes the deposition of dielectric films by RF sputtering. The RF sputtering technique can be used to deposit semiconductors, glasses and various other dielectric films.

In one preferred embodiment of the invention the alternating layers in steps d) and or f) are formed by use of Low Pressure Chemical Vapour Deposition. Hereby an advantageous batch processing of a large number of substrates in one step can be performed. In a preferred embodiment, the alternating layers of steps d) and or f) comprise silicon and silicon nitride. In another preferred embodiment, the alternating layers of steps d) and or f) comprise silicon rich silicon nitride and silicon nitride. A first defect in step e) can preferentially be formed by use of Plasma Enhanced Chemical Vapour Deposition of silicon dioxide. This silicon dioxide could hereby be doped with a large amount of different additives. This includes but are not restricted to Ge, B, P, Nd, Er, Al and N. The addition of doping materials can enhance the sensitivity of the refractive index towards UV radiation, which can be used to introduce a first defect to the planar photonic crystal waveguide.

The choice of silicon dioxide based material for the defect can be used in further embodiments of the invention, due to the fact that silicon dioxide can be used as an etch stop layer for reactive ion etching of silicon nitride and silicon. Hereby one passage can be formed which will be stopped on a first defect in the one-dimensional periodic structure.

In one embodiment of the invention, step g) of the method applies a mask to the top of the layered structure and one or more second defects are formed using a mask pattern by etching through a silicon nitride layer followed by an exposure to a thermal oxidation. Hereby a local oxidation of the underlying silicon layer is obtained and a line defect is formed.

In step g) of the method passages through the relatively thick layered structure is etched. This is in one embodiment of the invention done by use of a reactive ion etch. A preferred choice of gas mixture is $SF_6$ and $O_2$. This mixture will effectively etch both silicon and silicon nitride. An etch through the silicon oxide layer is done by use of a gas mixture of $CF_4$ and $CHF_3$.

In a preferred embodiment, the passages formed by the etching process of step g) are perpendicular to the surface of the substrate on which the thermal oxidation or first alternating layers are formed or perpendicular to the tangent plane defined by the maxima or minima of the corrugated surface of the substrate. In other preferred embodiments, the passages formed by the etching process of step g) are etched to form an angle $\alpha$ with the direction perpendicular to the surface of the substrate or a tangent plane to the surface.

With regard to later durability of the passages a thin silicon nitride diffusion barrier can advantageously be deposited in a step following step g), e.g. using Low pressure Chemical Vapour Deposition (LPCVD).

A Method for the Manufacture of a Planar Photonic Crystal Structure:

In an aspect of the invention, a method for the manufacture of a planar photonic crystal for the transmission of electromagnetic waves is provided, the method comprising the following steps:

A) Silicon is selected as substrate material
B) the substrate material is exposed to a thermal oxidation,
C) alternating layers are formed
D) a defect is formed
E) alternating layers are formed
F) a mask is applied to the top of the layered structure and straight passages are opened by etching.

The above described method of manufacturing a planar photonic crystal structure comprising passages or pillars may be combined with other features of the invention in the same way as the previously described method of manufacturing an integrated photonic crystal structure, where the equivalent steps are associated as follows: A)-a), B)-c), C)-d), D)-e), E)-f) and F)-g).

BRIEF DESCRIPTION OF THE DRAWINGS

In the following, the invention will be explained in more detail with reference to the new structures according to the invention shown in the drawing, in that FIG. 1 shows a known, one-dimensional periodic dielectric structure with a defect serving as a resonant cavity.

DETAILED DESCRIPTION OF EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
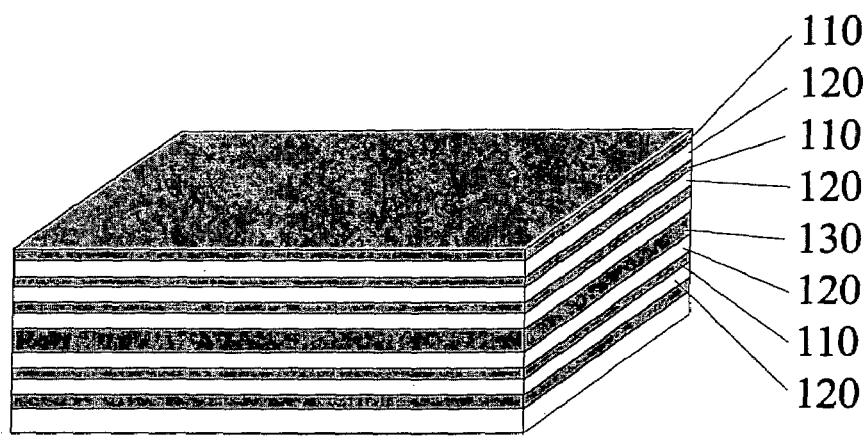

In FIG. 1, which shows a known, one-dimensional periodic dielectric structure, the reference figure 110 indicates a first lower refractive index material layer, and reference figure 120 indicates a second higher refractive index material layer. A defect in this layered structure is indicated at 130. It serves as a resonant cavity. The periodic layered structure exhibits a photonic band gap for propagation of radiation having a spectrum of electromagnetic modes in a direction perpendicular to the plane of the layers.

Figure 2:
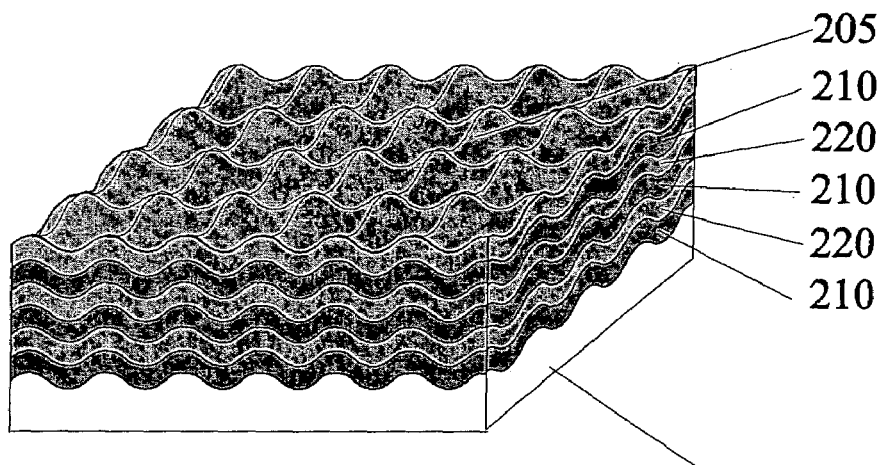
FIG. 2 shows a known, two-dimensional periodic dielectric structure.

In FIG. 2 there is shown a known two-dimensional periodic dielectric structure, the reference figure 200 indicates the substrate with a periodic pattern of holes e.g. local minima, and reference figure 210 indicates a first lower refractive index material layer. Reference figure 220 indicates a second higher refractive index material layer. These layers (210 and 220) are repeated in a manner where the original surface of the substrate is reproduced all through the layers as indicated at 205. The periodic layered structure exhibits high omnidirectional reflectivity for propagation of radiation having a spectrum of electromagnetic modes for all angles of incidence to the surface larger than zero.

Figure 3:
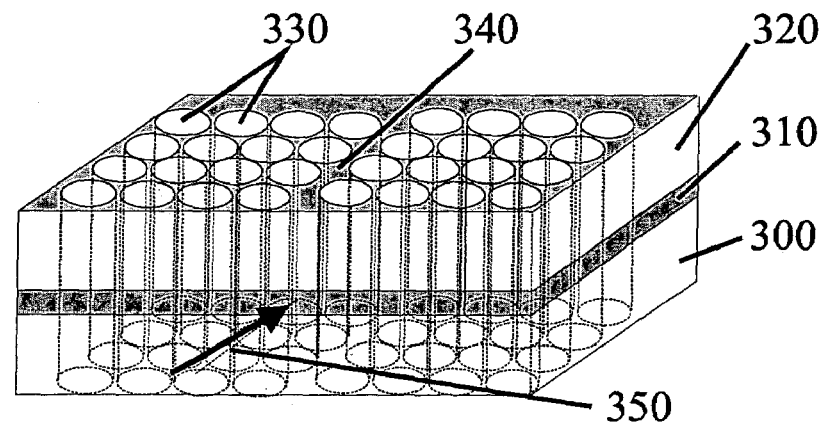
FIG. 3 shows a known, two-dimensional periodic dielectric structure with a channel waveguide.

In FIG. 3 there is shown a known two-dimensional periodic dielectric structure with a channel waveguide. A first lower cladding layer is indicated at 300, a film waveguide core is indicated at 310 and an upper cladding layer is indicated at 320. A structure perpendicular to the surface of the film waveguide core with a plurality of essentially straight passages arranged in a two-dimensional periodic pattern is indicated at 330. A line defect in this two-dimensional periodic pattern is shown at 340. This line defect does in connection with the film waveguide working by total internal reflection lead to the formation of a channel waveguide indicated at 350.

Figure 4:
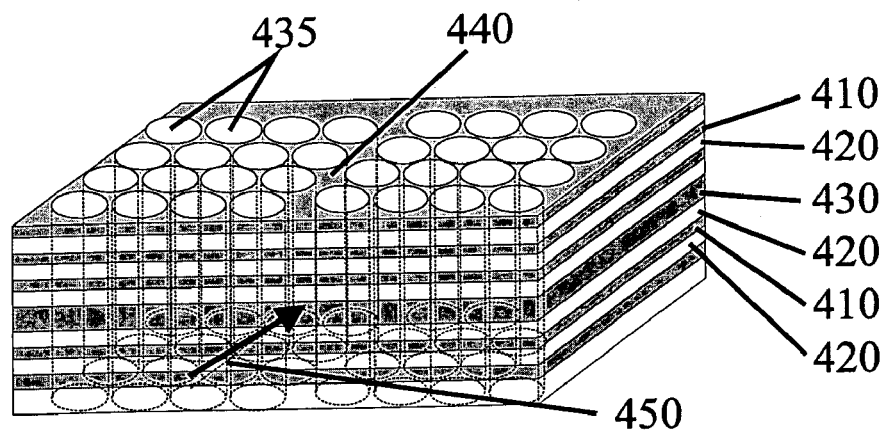
FIG. 4 shows a periodic dielectric structure comprising a periodic pattern of layers and passages with a channel waveguide according to the present invention.

In FIG. 4 a photonic crystal waveguide according to the invention is shown. A layered structure is formed with a one-dimensional periodic dielectric structure with for example two layers where 410 indicates a first lower refractive index material layer, and reference figure 420 indicates a second higher refractive index material layer. This layered structure exhibits a photonic band gap for propagation of radiation having a spectrum of electromagnetic modes in a direction perpendicular to the plane of the layers. A first defect is indicated by 430 which results in an electromagnetic mode localised in the vicinity of the first defect and results in that electromagnetic radiation is vertically confined. A second structure perpendicular to the surface with a plurality of essentially identical straight passages arranged in a two-dimensional periodic pattern is indicated at 435. This second structure exhibits a two-dimensional photonic band gap for propagation of radiation having a spectrum of electromagnetic modes in any direction in the plane of the layers. A line defect in this two-dimensional periodic pattern is shown at 440. This defect will result in an electromagnetic mode localised in the vicinity of the vertical defect. The combination of the first defect 430 and second defect 440 forms a channel waveguide as indicated at 450.

It is in general to be understood that even though the passages of the second sub-structure are shown in the drawings as were the individual passages to touch each other, other embodiments of the invention in which a certain distance is introduced between the outlines of each passage (the appropriate size of which will depend on the purpose of the structure, the wavelength of light, the cross sectional pattern of the passages, etc.) can be useful.

Figure 5:
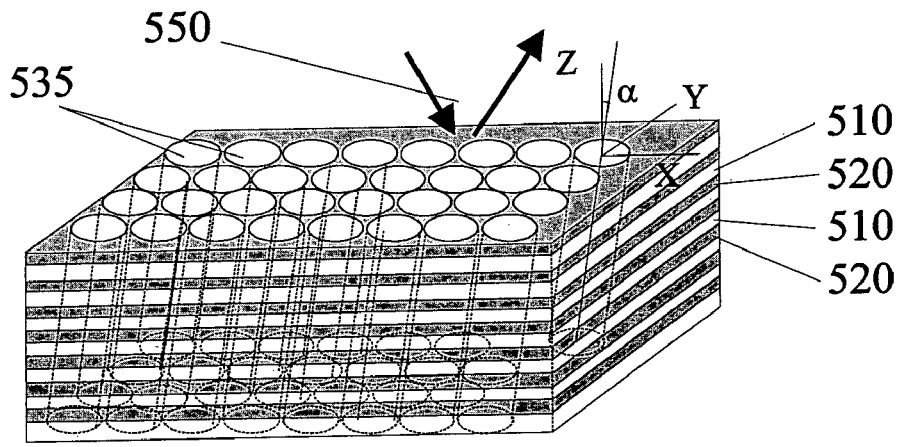
FIG. 5 shows an embodiment of a photonic crystal structure in the absence of defects in accordance with an aspect of the present invention. In this example said surface is planar.

In FIG. 5 an embodiment of a photonic crystal in accordance with an aspect of the present invention is shown. A layered structure is formed with a one-dimensional periodic dielectric structure with for example two layers where 510 indicates a first lower refractive index material layer, and reference figure 520 indicates a second higher refractive index material layer. This layered structure exhibits a photonic band gap for propagation of radiation having a spectrum of electromagnetic modes in a direction perpendicular to the plane of the layers. A plurality of essentially identical straight passages arranged in a two-dimensional periodic pattern as indicated at 535 is cut through the layered structure at an angle $\alpha$ from normal incidence. A Cartesian coordinate systems (x,y,z) is shown along with the angle $\alpha$. The directions x and y are in the plane of the layers whereas the direction z is perpendicular to this plane. This second structure exhibits a two-dimensional photonic band gap for propagation of radiation having a spectrum of electromagnetic modes in any direction in the plane of the layers. The photonic crystal of FIG. 5 with no intentional defects is to be applied in the filtering of electromagnetic radiation through reflection as indicated by the arrows at 550 or by a combination of transmission and reflection not shown. For example this structure can be used to perform polarisation control in specific wavelength intervals and under certain intervals of angular incidence of radiation. It is to be understood that even though the passages of the second structure are shown as were the individual passages to touch each other, this is only a schematic representation, and other embodiments of the invention can be useful.

Figure 6:
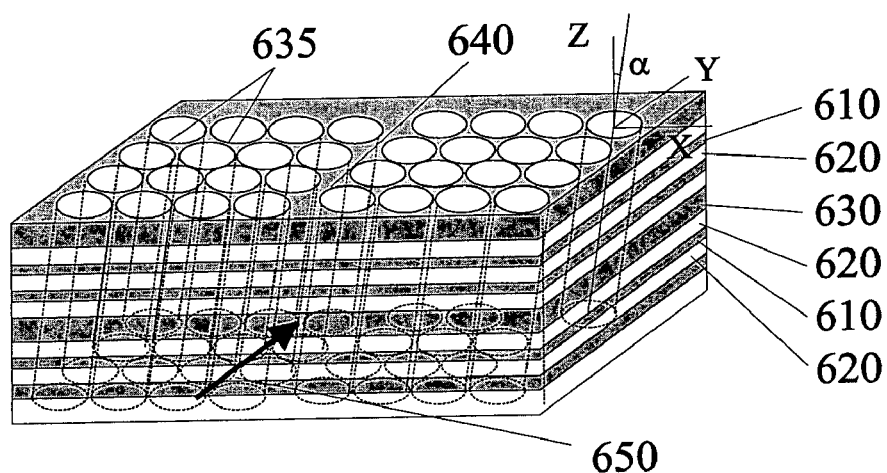
FIG. 6 shows an embodiment of a photonic crystal structure with a combination of two line defects which form a channel waveguide in accordance with an aspect of the invention.

FIG. 6 shows an embodiment of a photonic crystal in accordance with an aspect of the present invention. A layered structure is formed with a one-dimensional periodic dielectric structure with for example two layers where 610 indicates a first lower refractive index material layer, and reference figure 620 indicates a second higher refractive index material layer. This layered structure exhibits a photonic band gap for propagation of radiation having a spectrum of electromagnetic modes in a direction perpendicular to the plane of the layers. A first defect is indicated by 630 which results in an electromagnetic mode localised in the vicinity of the first defect and results in that electromagnetic radiation is vertically confined. A plurality of essentially identical straight passages arranged in a two-dimensional periodic pattern as indicated at 635 is cut through the layered structure at an angle α from normal incidence. A Cartesian coordinate systems (x,y,z) is shown along with the angle α. The directions x and y are in the plane of the layers whereas the direction z is perpendicular to this plane. This second structure exhibits a two-dimensional photonic band gap for propagation of radiation having a spectrum of electromagnetic modes in any direction in the plane of the layers. A line defect in this two-dimensional periodic pattern is shown at 640. This defect will result in an electromagnetic mode localised in the vicinity of the vertical defect. The combination of the first defect 630 and second defect 640 forms a channel waveguide as indicated at 650.

Figure 7:
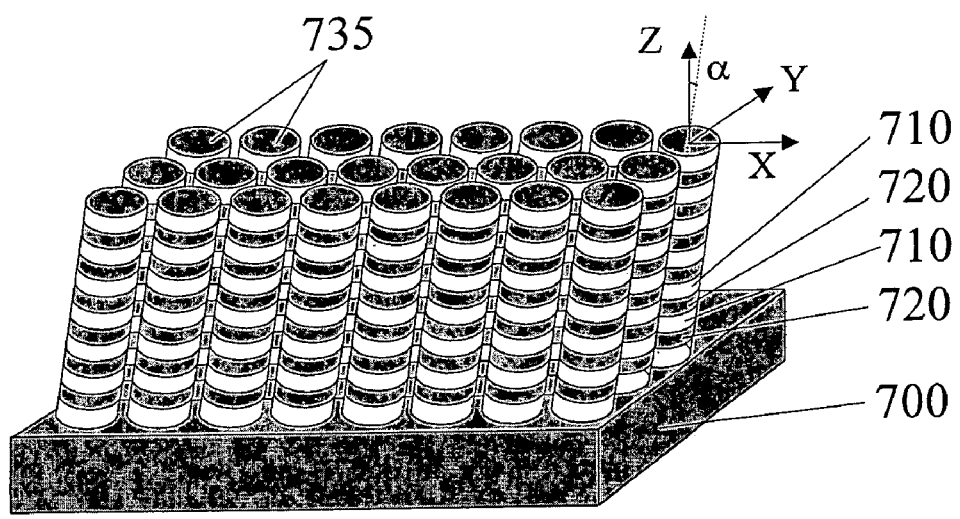
FIG. 7 shows an embodiment of a photonic crystal structure comprising a periodic pattern of pillars each comprising periodic layers in the absence of defects in accordance with an aspect of the present invention. In this example said surface is planar.

FIG. 7 shows an embodiment of a photonic crystal in accordance with an aspect of the present invention. A layered structure is formed on top of a substrate 700 with a one-dimensional periodic dielectric structure with for example two layers where 710 indicates a first lower refractive index material layer, and reference figure 720 indicates a second higher refractive index material layer. This layered structure exhibits a photonic band gap for propagation of radiation having a spectrum of electromagnetic modes in a direction perpendicular to the plane of the layers. A plurality of essentially straight pillars 735 is cut out of the layered structure at an angle α from normal incidence. A Cartesian coordinate systems (x,y,z) is shown along with the angle α. The directions x and y are in the plane of the layers whereas the direction z is perpendicular to this plane. This second structure exhibits a two-dimensional photonic band gap for propagation of radiation having a spectrum of electromagnetic modes in any direction in the plane of the layers. The structure provides high omnidirectional reflectivity of electromagnetic radiation and band gaps for some or all polarisation states, in specific wavelength intervals and under certain intervals of angular incidence of radiation.

Figure 8:
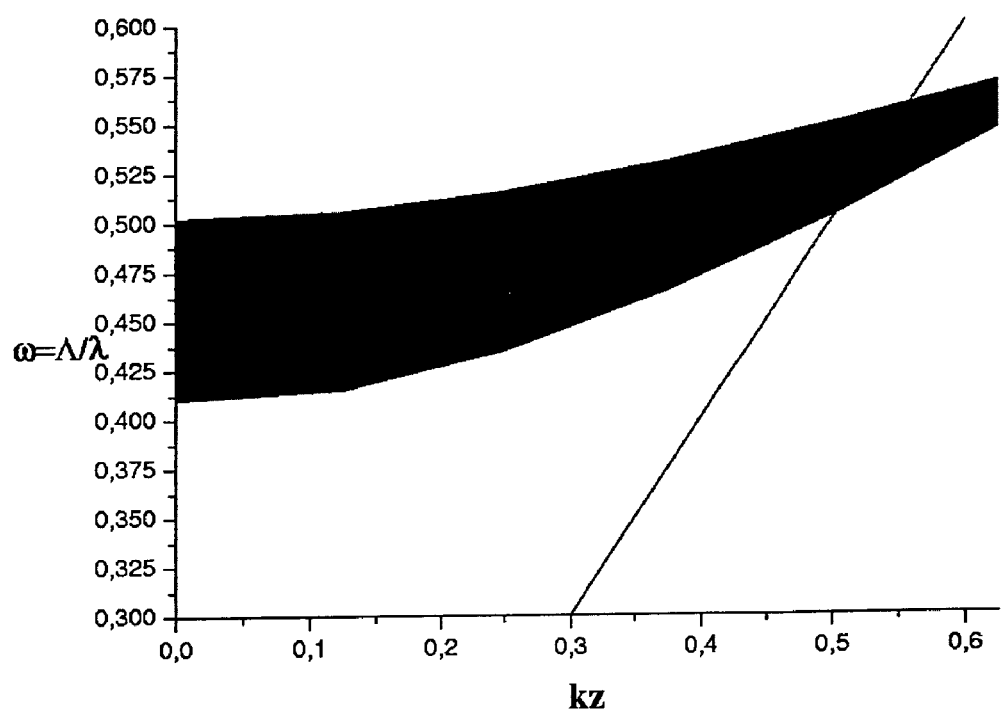
FIG. 8 shows a band gap for all polarisation states for a photonic crystal in accordance with an aspect of the present invention, this structure shows a two-dimensional periodic substrate surface and the angle of the second structure $\alpha=1°$.

In FIG. 8 a band gap dependency on the normal wave vector component for all polarisation states of a photonic crystal structure in accordance with an aspect of the present invention are shown. This band gap dependency is for a photonic crystal without any intentional defects and a substrate surface with a two-dimensional periodic surface. The angle of the second structure is α=1°. The contents of FIG. 8 will be explained in more detail in example 1.

Figure 9:
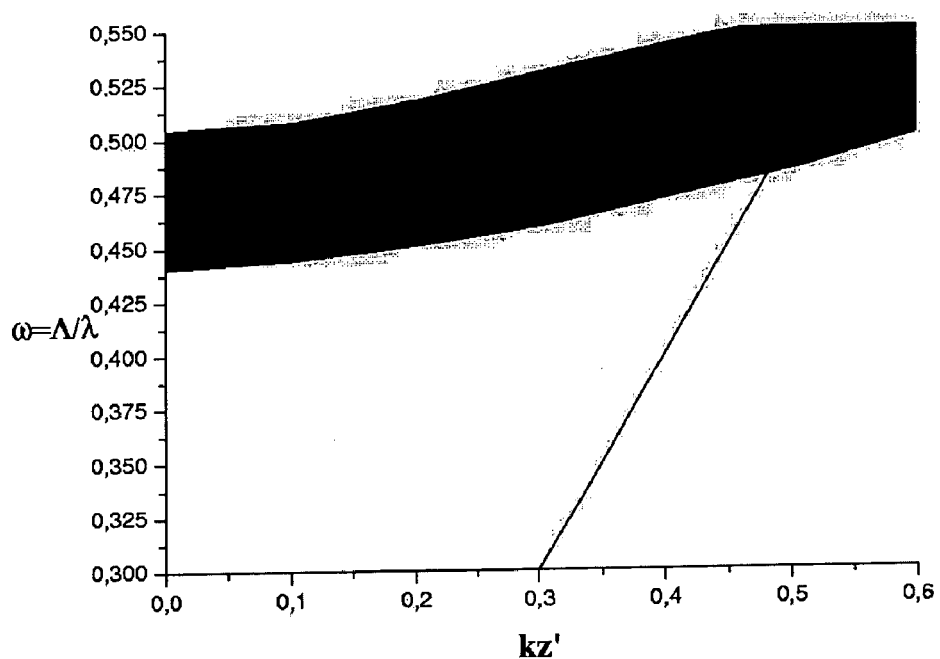
FIG. 9 shows a band gap for all polarisation states for a photonic crystal structure in accordance with an aspect of the present invention. The substrate surface is plane and the angle of the second structure $\alpha=35.26°$.

In FIG. 9 a band gap dependency on the normal wave vector component for all polarisation states for a photonic crystal structure in accordance with an aspect of the present invention are shown. This band gap dependency is for a photonic crystal structure without any intentional defects and a planar surface. The angle of the second structure is α=35.26°. The contents of this will be explained in more detail in connection with example 2.

Figure 10:
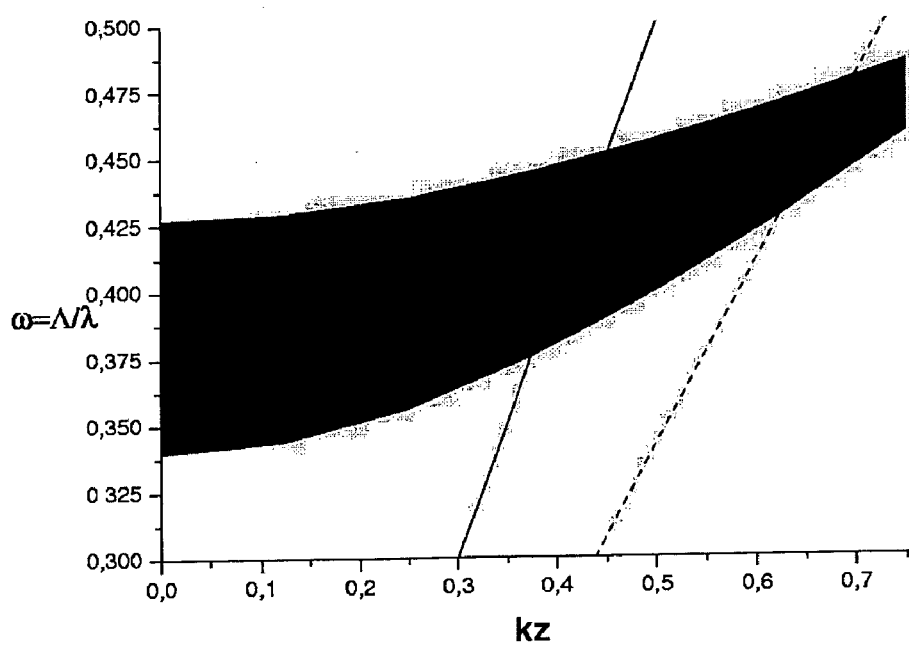
FIG. 10 shows a band gap for all polarisation states for a photonic crystal structure in the absence of defects in accordance with an aspect of the present invention with a plane surface and $\alpha=0°$.

In FIG. 10 a band gap dependency on the normal wave vector component for all polarisation states for a photonic crystal structure in accordance with an aspect of the present invention are shown. This band gap dependency is for a photonic crystal structure without any intentional defects, a plane surface and α=0°. The contents of this will be explained in more detail in connection with example 3.

Figure 11:
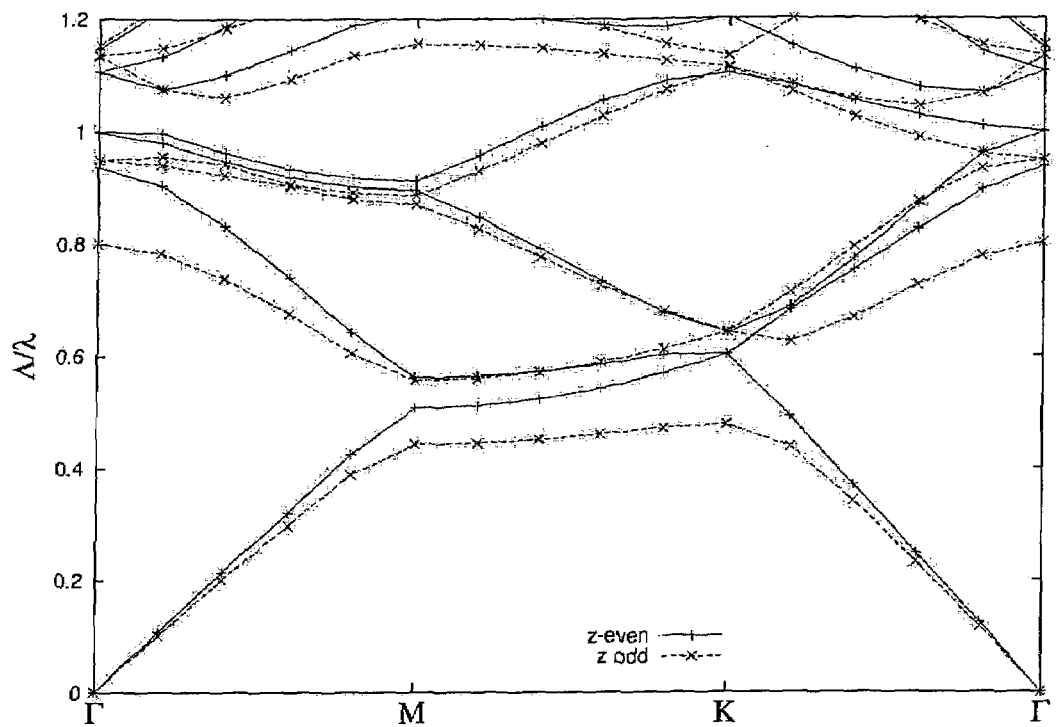
FIG. 11 shows a band diagram for all polarisation states for a photonic crystal structure in the absence of defects in accordance with an aspect of the present invention and $\alpha=0°$.

FIG. 11 shows a band diagram for in-plane propagation for all polarisation states for photonic crystal structure in accordance with an aspect of the present invention in the absence of defects, for a planar surface and angle α=0°. The contents of this will be explained in more detail in connection with example 4.

Figure 12:
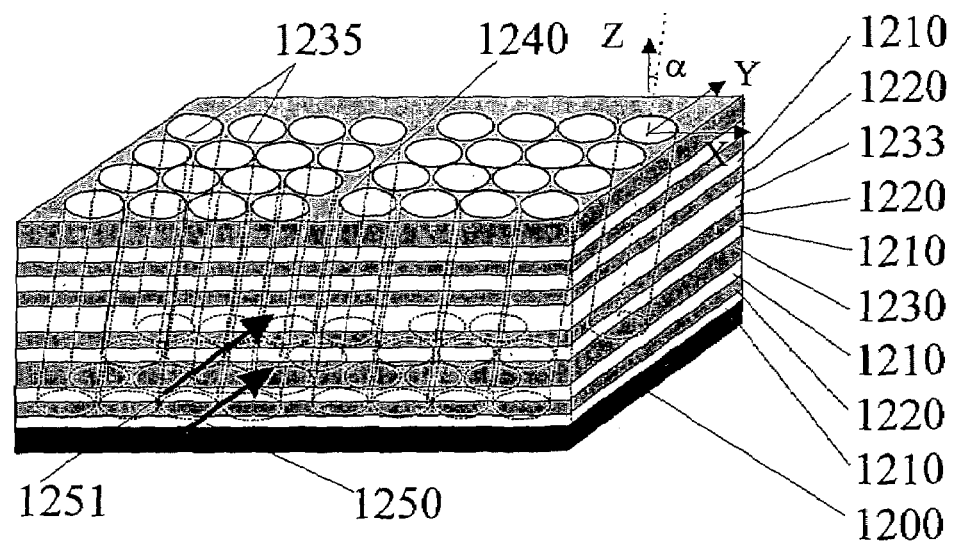
FIG. 12 shows an embodiment of a photonic crystal structure in accordance with an aspect of the present invention in the presence of three defects. In this example the first surface is planar.

FIG. 12 shows an embodiment of a photonic crystal in which three defects have been embedded in accordance with an aspect of the present invention. A layered structure is formed on top of a substrate 1200 with a one-dimensional periodic dielectric structure with for example two layers where 1210 indicates a first lower refractive index material layer, and reference figure 1220 indicates a second higher refractive index material layer. This layered structure exhibits a photonic band gap for propagation of radiation having a spectrum of electromagnetic modes in a direction perpendicular to the plane of the layers. A first defect is indicated by 1230 which results in an electromagnetic mode localised in the vicinity of the first defect and results in that electromagnetic radiation is vertically confined. Further a second defect is indicated by 1233 which results in an electromagnetic mode localised in the vicinity of the second defect and results in that electromagnetic radiation is vertically confined. A plurality of essentially identical straight passages arranged in a two-dimensional periodic pattern as indicated at 1235 is cut through the layered structure at an angle α from normal incidence. A Cartesian co-ordinate systems (x,y,z) is shown along with the angle α. The directions x and y are in the plane of the layers whereas the direction z is perpendicular to this plane. This second structure exhibits a two-dimensional photonic band gap for propagation of radiation having a spectrum of electromagnetic modes in any direction in the plane of the layers. A line defect in this two-dimensional periodic pattern is shown at 1240. This defect will result in an electromagnetic mode localised in the vicinity of the vertical defect. The combination of the first defect 1230, second defect 1233 and the line defect 1240 forms two channel waveguides as indicated at 1250 and 1251. In the absence of defects, this structure exhibits high omnidirectional reflectivity and band gaps. Assuming that optical signals with different frequencies are coupled into the waveguide 1251 efficient filtering of frequency signals can be achieved in volumes of only a few 1 $\mu m^3$. Here one frequency will continue in waveguide 1251 whereas the other frequency will couple to waveguide 1250. In similar fashion power coupling and more advanced fast all-optical signal processing can be performed in volumes that are of only a few 1 $\mu m^3$ thanks to the low radiation losses allowed in the bulk. All kinds of integrated photonic components can be embedded in this manner, and non-linear response can be exploited in order to implement switching, amplification, and wavelength conversion in connection with lasers.

Figure 13:
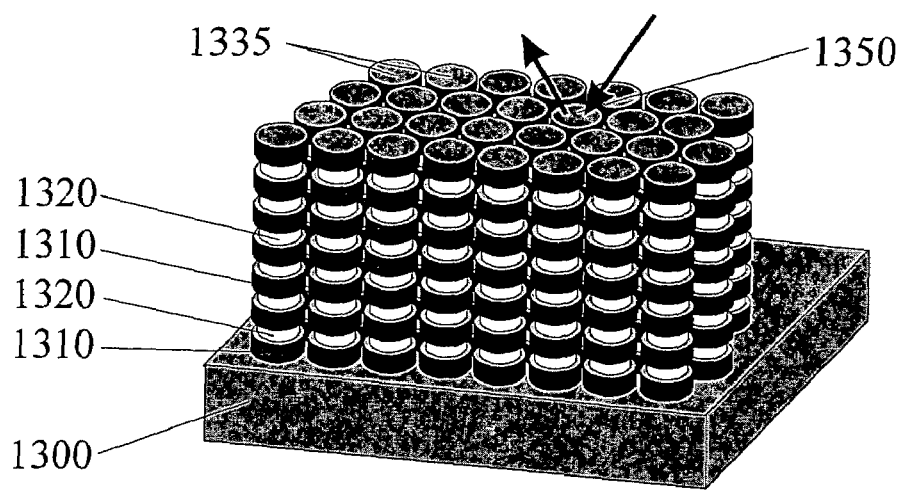
FIG. 13 shows an embodiment of a photonic crystal structure in accordance with an aspect of the present invention in the absence of defects. In this example the first surface is planar, and $\alpha=0°$.

FIG. 13 shows an embodiment of a photonic crystal in accordance with an aspect of the present invention. A substrate is supplied 1300 and a layered structure is formed with a one-dimensional periodic dielectric structure with for example two layers where 1310 indicates a first lower refractive index material layer, and reference figure 1320 indicates a second higher refractive index material layer. This layered structure exhibits a photonic band gap for propagation of radiation having a spectrum of electromagnetic modes in a direction perpendicular to the plane of the layers. A plurality of pillars arranged in a two-dimensional periodic pattern as indicated at 1335 is cut out of the layered structure in a direction perpendicular to the plane of the layers. This second structure exhibits a two-dimensional photonic band gap for propagation of radiation having a spectrum of electromagnetic modes in any direction in the plane of the layers. It is to be noted that in an embodiment where two materials such as for example silicon and silicon dioxide or silicon nitride and silicon dioxide is used as the low and high refractive index materials the pillars may exhibit a corrugated surface as indicated at 1310 and 1320. The radius of the pillars at these two points is not identical. This effect can be used to enlarge the photonic band gap for propagation of radiation having a spectrum of electromagnetic modes in a direction perpendicular to the plane of the layers. The photonic crystal of FIG. 13 with no intentional defects may e.g. be applied in the filtering of electromagnetic radiation through reflection as indicated by the arrows at 1350 or by a combination of transmission and reflection not shown. For example this structure can be used to perform polarisation control in specific wavelength intervals and under certain intervals of angular incidence of radiation. It is to be understood that even though the pillars are shown as were the individual passages to touch each other, this need not be the case, and other embodiments of the invention can be useful.

In the following, it is explained step by step how a planar photonic crystal according to the invention may be produced.

Figure 14:
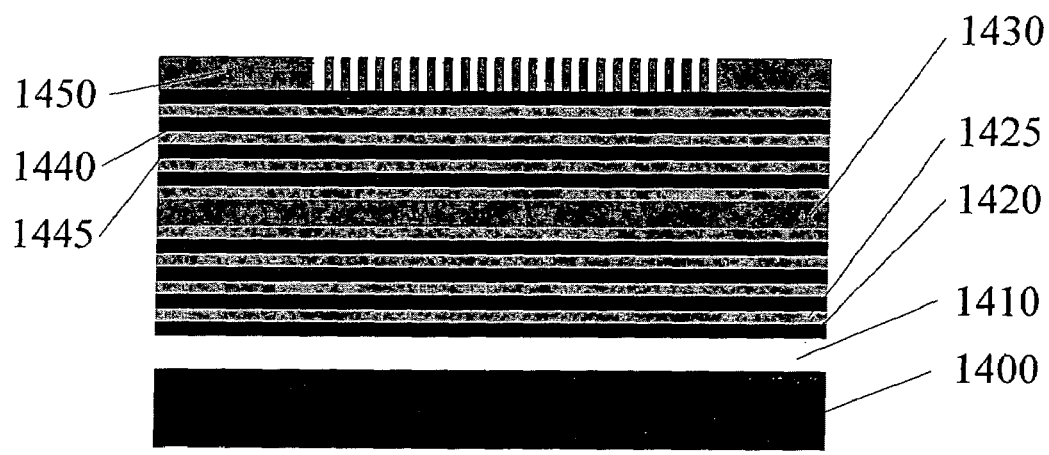
FIG. 14a)–b) show the steps involved in the method for the production of a planar photonic crystal according to the invention.
Figure 14:
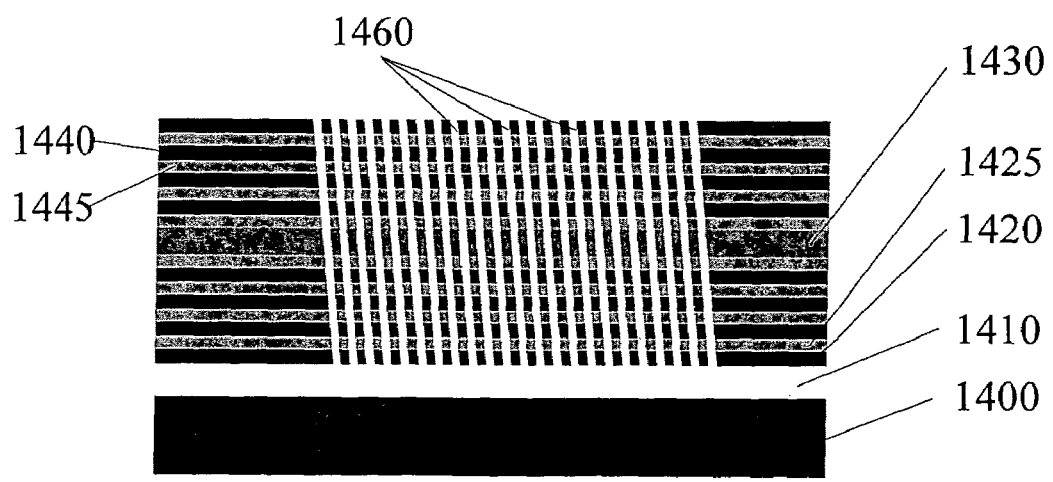

Silicon is selected as substrate material, which is indicated at 1400 in FIG. 14 a) and FIG. 14 b). A buffer layer is formed by thermal oxidation of the substrate material, which is indicated at 1410. Alternating layers of silicon nitride 1420 and high refractive index silicon nitride 1425 are formed. The difference in refractive index is achieved by introducing a surplus of silicon in the silicon nitride layer with the higher refractive index. A first defect is formed for example by deposition of silicon dioxide as indicated at 1430. A second stack of alternating layers of silicon nitride 1440 and silicon rich silicon nitride 1445 is formed. A mask is deposited on top of the layered structure as indicated at 1450, and a plurality of straight passages are opened by etching with a reactive ion beam through the layered structure, as indicated at 1460 in FIG. 14 b). The angle between the reactive ion beam and the plane of the surface determines the angle α under which the plurality of straight passages cuts through the layered structure.

Figure 15:
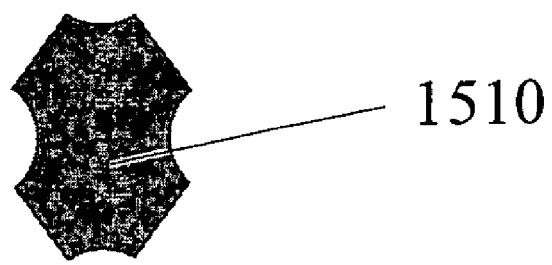
FIG. 15a)–b) show a top view of a single etching mask hole shape and a plurality of etching hole shapes to be used when forming a photonic crystal structure in accordance with an aspect of the present invention in the absence of defects.
Figure 15:
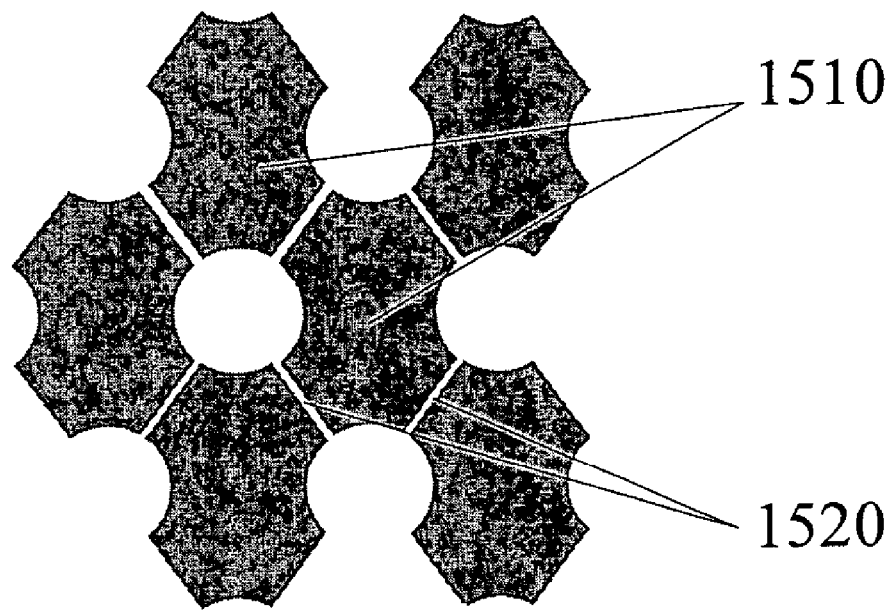

In FIG. 15 a) an example of a single etching mask hole 1510 is shown. In FIG. 15b) a plurality of etching hole shapes are shown. The etching hole structure of FIG. 15 b) will result in the formation of a pillar structure in accordance with an aspect of the present invention when used as an etching mask. The small bridges indicated by 1520 will during the etching process be removed due to chemical etching by the reactive ions. It is advantageous to use such a bridge structure because the photoresist pattern will exhibit smaller tendency to lift off during development of the structure.

Figure 16:
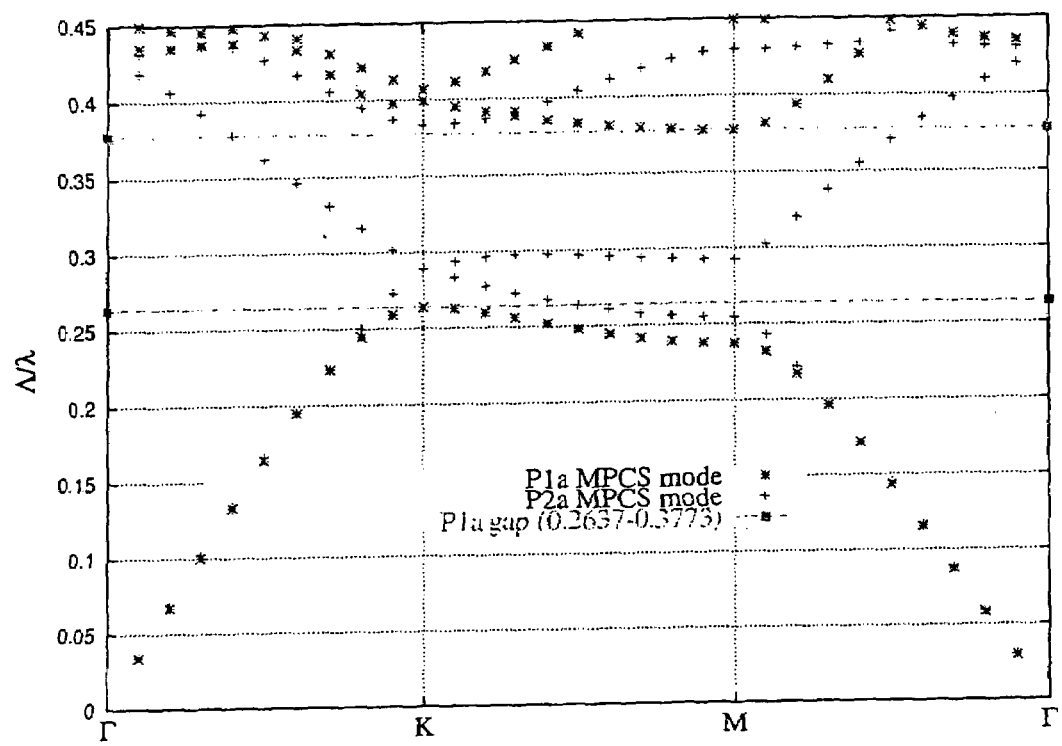
FIG. 16 shows a band diagram for all polarisation states, in that FIG. 16 a) shows the band diagram for propagation parallel to the layer plane, and FIG. 16 b) shows the band diagram for propagation perpendicular to the layer plane, for a photonic crystal structure in accordance with an aspect of the present invention.
Figure 16:
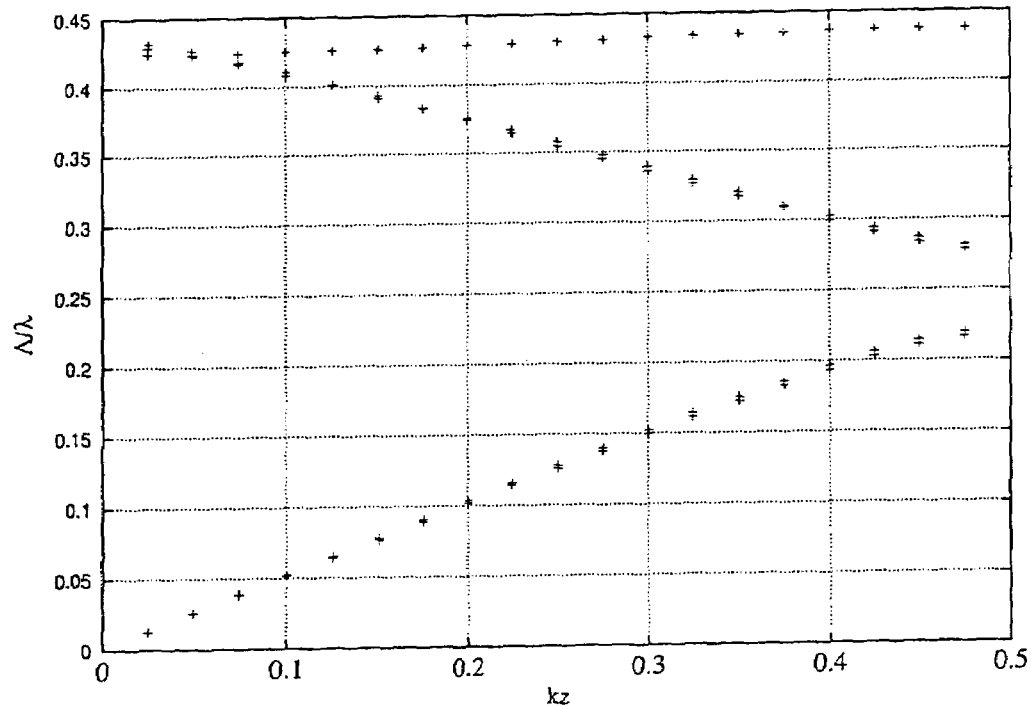

FIG. 16 shows a band diagram for all polarisation states; in FIG. 16 a) for propagation parallel to the layer plane and in FIG. 16 b) for propagation perpendicular to the layer plane, for a planar photonic crystal structure in accordance with an aspect of the present invention in the absence of defects. The contents of this will be explained in more detail in connection with example 5.

Figure 17:
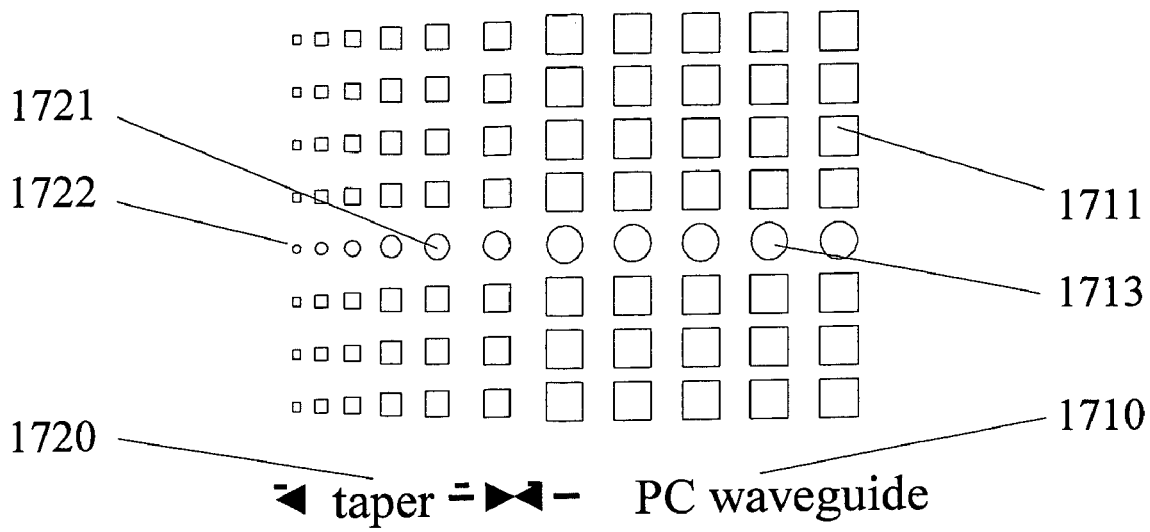
FIG. 17 shows a two-dimensional photonic crystal adiabatic coupling structure in accordance with the present invention, in that FIG. 17 a) shows a top view of the adiabatic coupler and FIG. 17 b) shows a cross section perpendicular to the layer plane and parallel with the waveguide axis.
Figure 17:
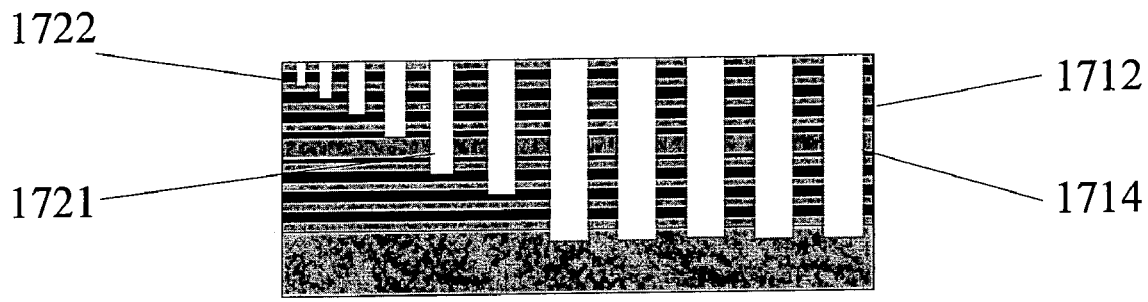

FIG. 17 shows a two-dimensional photonic crystal adiabatic coupling structure in an embodiment based on a planar photonic crystal waveguide. FIG. 17 a) shows a top view of the adiabatic coupler and FIG. 17 b) shows a cross section perpendicular to the layer plane and parallel with the waveguide axis. The planar photonic crystal waveguide is indicated with 1710. Here the periodic two-dimensional photonic band gap area is constituted of rectangular holes 1711 through the layered structure 1712 and a line defect constituted of individual passages with round holes 1713 forms the core for the waveguide together with a layer defect 1714. It is to be understood that other shapes for the holes 1711 through the layered structure and other types of line defects could be useful. The taper region is indicated with 1720. This region constitutes the adiabatic mode converter based on progressively changing the size of the individual second defects through the structure indicated by 1721 and 1722. By choosing different sizes of holes the etching in reactive ion etching will automatically yield a progressively deeper etch as the hole size increases.

Figure 18:
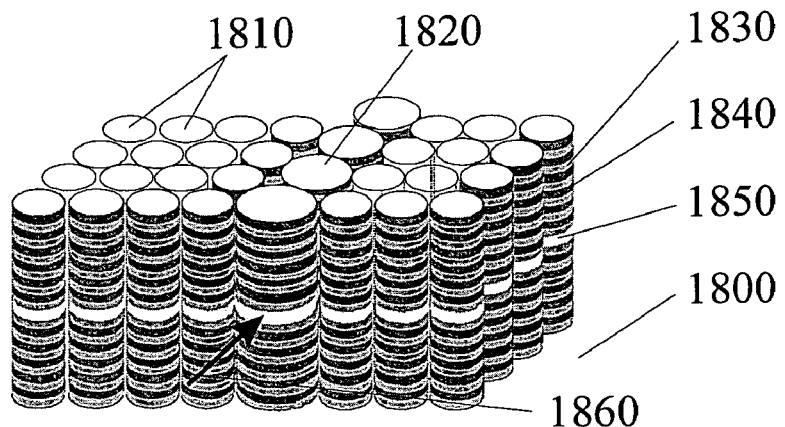
FIG. 18 shows an embodiment of a photonic crystal waveguide comprising pillars in accordance with an aspect of the present invention.

In FIG. 18 an embodiment of a photonic crystal waveguide in accordance with an aspect of the present invention is shown. A third structure perpendicular to the surface of the substrate indicated by 1800 with a plurality of essentially straight pillars arranged in a two-dimensional periodic pattern is indicated at 1810. This third structure exhibits a two-dimensional photonic band gap for propagation of radiation having a spectrum of electromagnetic modes in any direction in a plane parallel to the surface. A third line defect in this two-dimensional periodic pattern is shown at 1820. This defect will result in an electromagnetic mode localised in the vicinity of the third defect. The pillars have in a preferred embodiment a one-dimensional periodic dielectric structure with two layers where 1830 indicates a first lower refractive index material layer, and reference figure 1840 indicates a second higher refractive index material layer. This layered structure exhibits a photonic band gap for propagation of radiation having a spectrum of electromagnetic modes in any direction perpendicular to the substrate plane. A fourth layer defect indicated by 1850 will localise an electromagnetic mode in the vicinity of the defect and results in that electromagnetic radiation is vertically confined. The combination of the fourth layer defect 1850 and the third line defect 1820 forms a channel waveguide as indicated at 1860.

Figure 19:
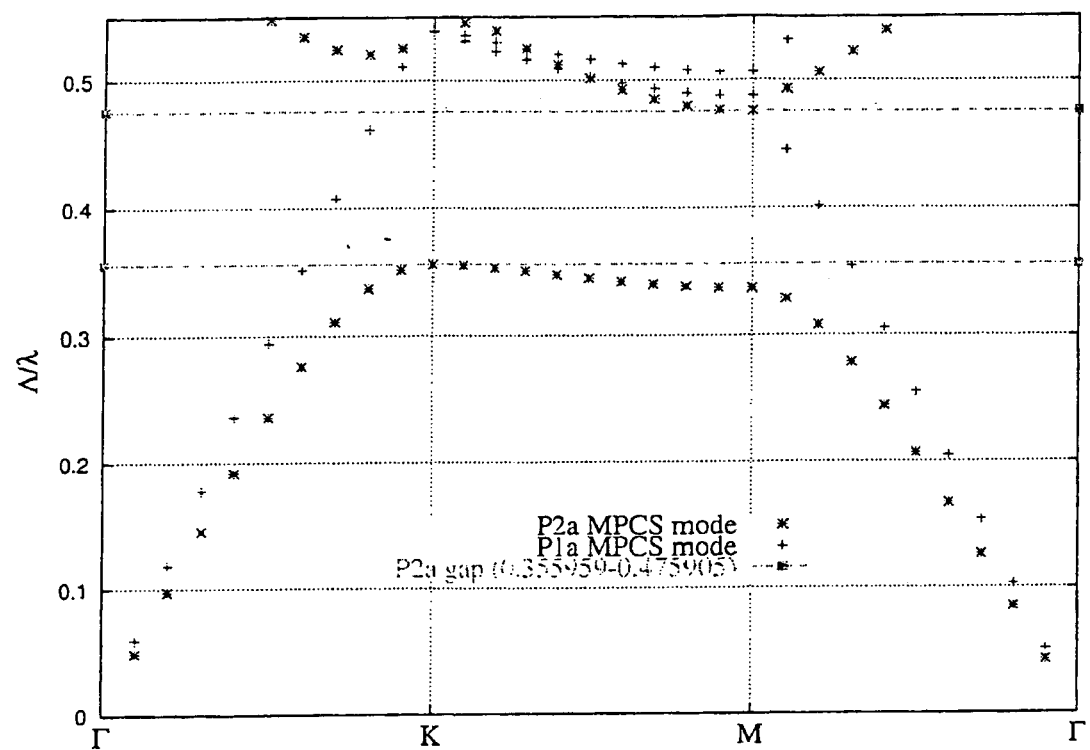
FIG. 19 shows a band diagram for all polarisation states, in that FIG. 19 a) shows the band diagram for propagation parallel to the layer plane, and FIG. 19b) shows the band diagram for propagation perpendicular to the layer plane, for a photonic crystal structure in accordance with an aspect of the present invention.
Figure 19:
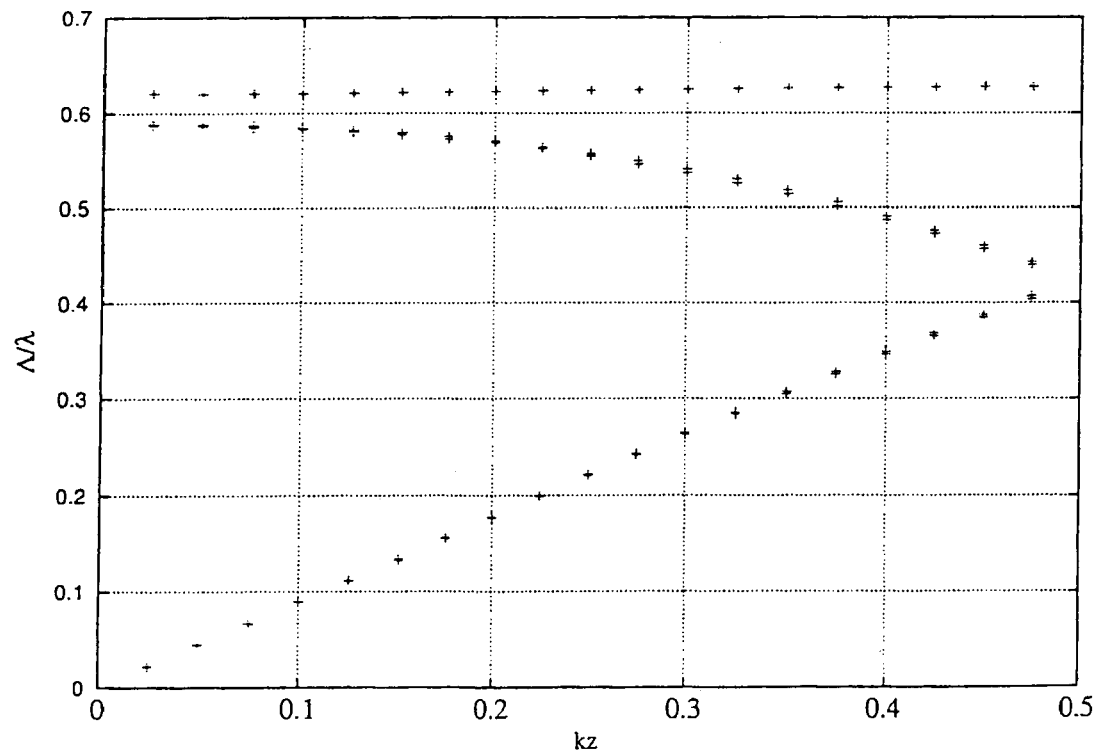

FIG. 19 shows a band diagram for all polarisation states, in FIG. 19 a) for propagation parallel to the layer plane and in FIG. 19 b) for propagation perpendicular to the layer plane, for a photonic crystal structure with straight pillars in accordance with an aspect of the present invention. The contents of this will be explained in more detail in connection with example 6.

Figure 22:
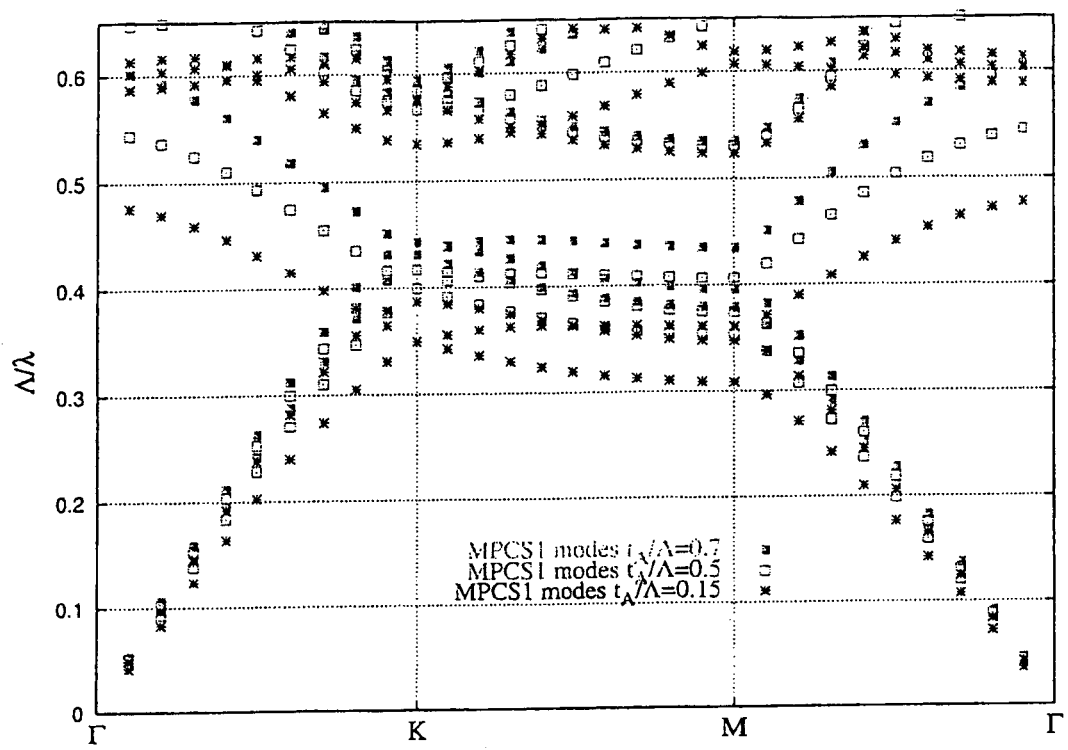
FIG. 22a)–b) show a band diagram for all polarisation states, in that FIG. 22 a) shows the band diagram for propagation parallel to the layer plane, and FIG. 22b) shows the band diagram for propagation perpendicular to the layer plane, for a photonic crystal structure in accordance with an aspect of the present invention.
Figure 22:
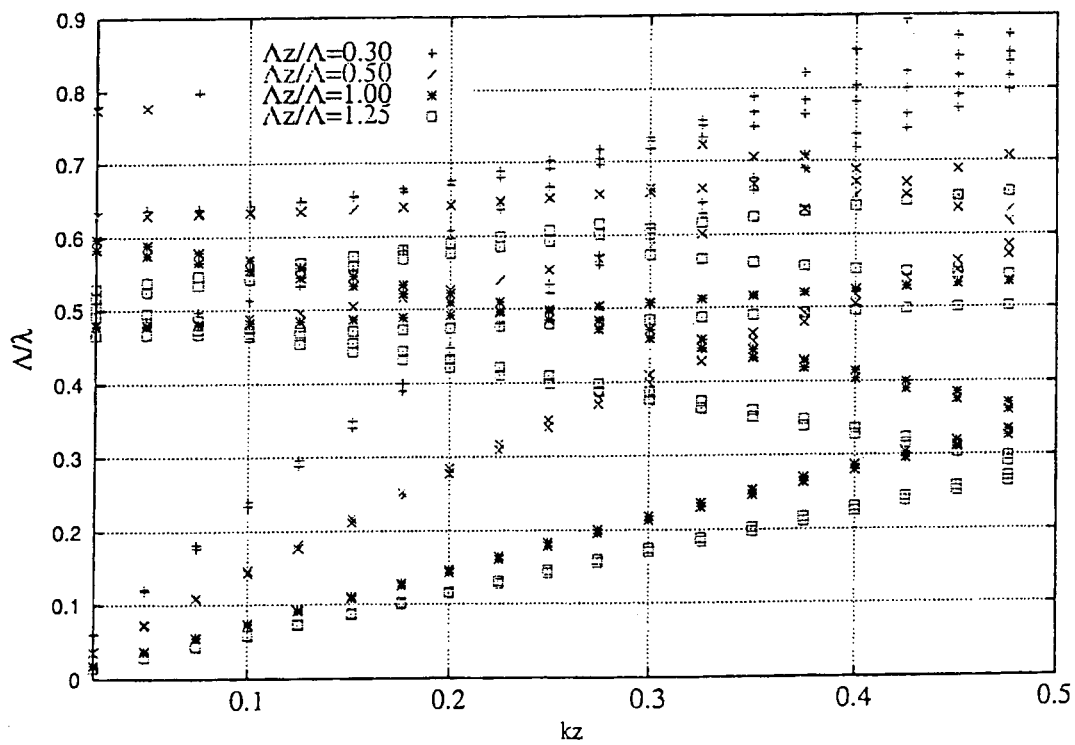

FIG. 22 shows a band diagram for all polarisation states, in FIG. 22 a) for propagation parallel to the layer plane for different relative layer thicknesses $t_A/\Lambda$ and in FIG. 22 b) for propagation perpendicular to the layer plane for different relative periods of refractive index variation $\Lambda_z/\Lambda$ perpendicular to the layers, for a photonic crystal structure with straight cylindrical passages in accordance with an aspect of the present invention. The contents of this will be explained in more detail in connection with example 7.

In the following, it is explained step by step how a planar photonic crystal waveguide according to the invention is produced.

Figure 20:
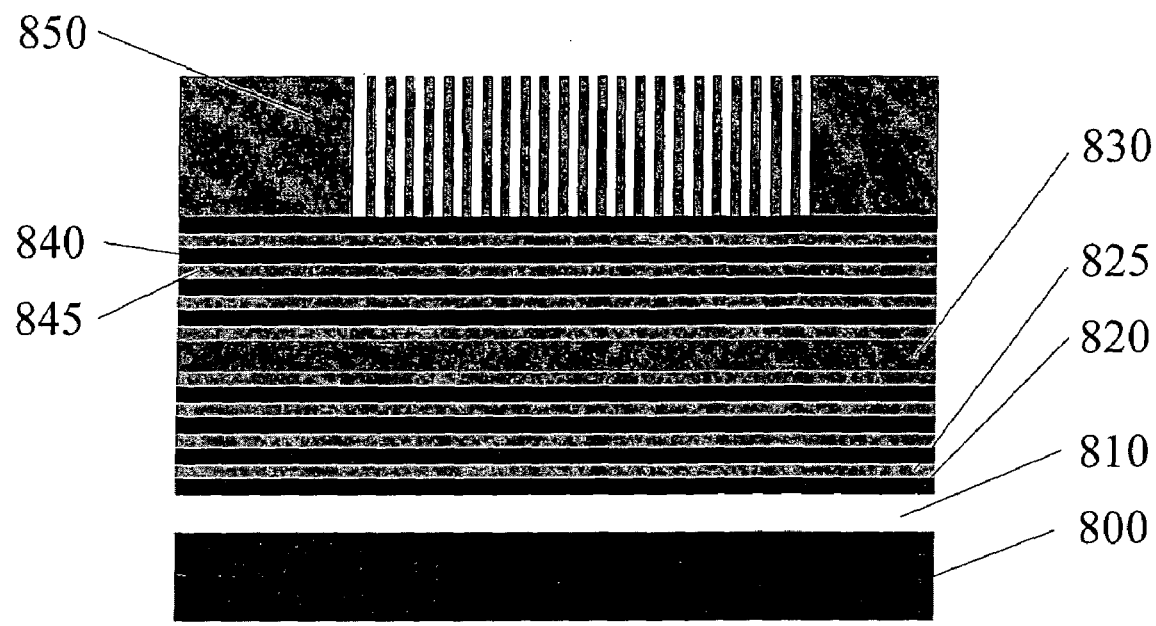
FIG. 20a)–b) show the steps involved in the method for the production of a planar photonic crystal waveguide according to the invention.
Figure 20:
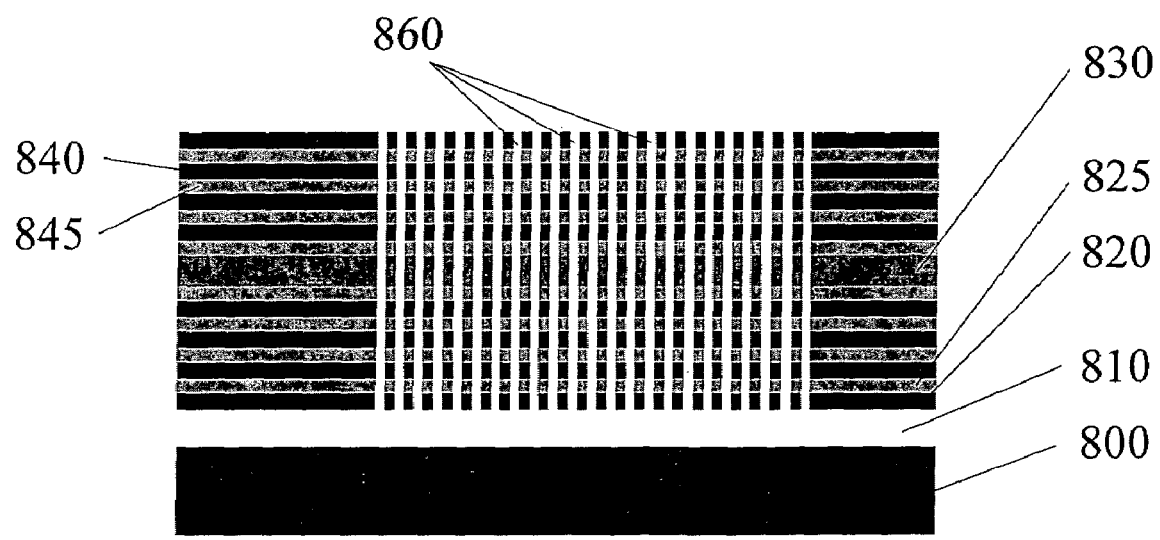

Silicon is selected as substrate material, which is indicated at 800 in FIG. 20 a) and FIG. 20 b). A buffer layer is formed by thermal oxidation of the substrate material, which is indicated at 810. Alternating layers of silicon 820 and silicon nitride 825 are formed. A first defect is formed for example by deposition of silicon dioxide as indicated at 830. A second stack of alternating layers of silicon 840 and silicon nitride 845 is formed. A mask is deposited on top of the layered structure as indicated at 850, and the straight passages are opened by etching through the layered structure, as indicated at 860 in FIG. 20 b).

An alternative method for the production of the invention is in the following explained step by step.

Figure 21:
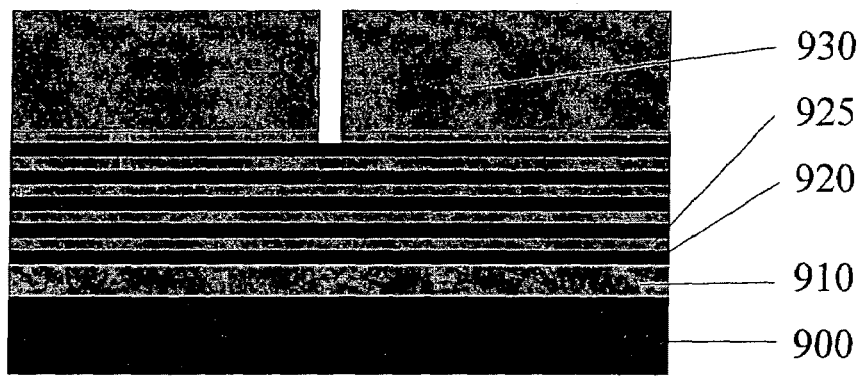
FIG. 21a)–c) show the steps involved in an alternative method for the production of a planar photonic crystal waveguide according to the invention.
Figure 21:
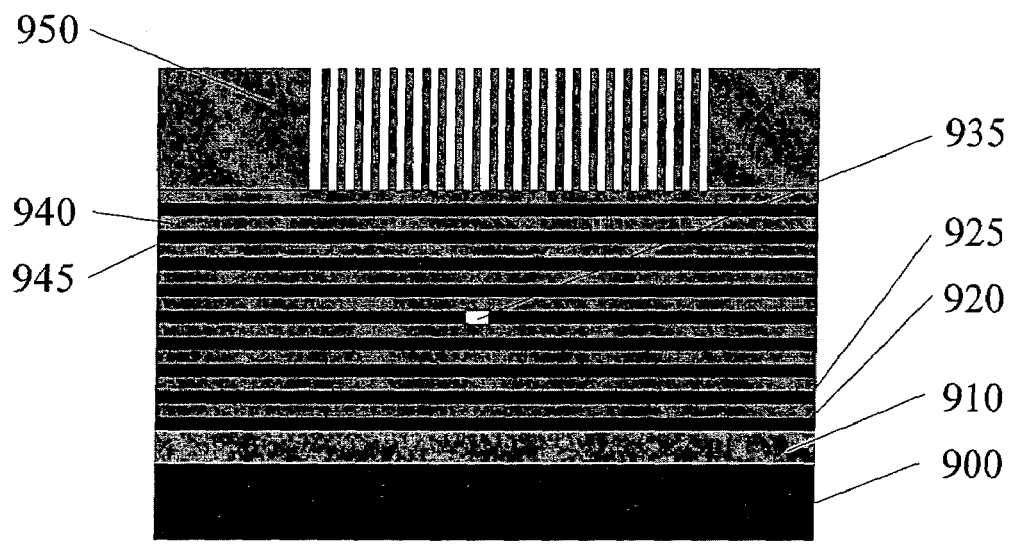
Figure 21:
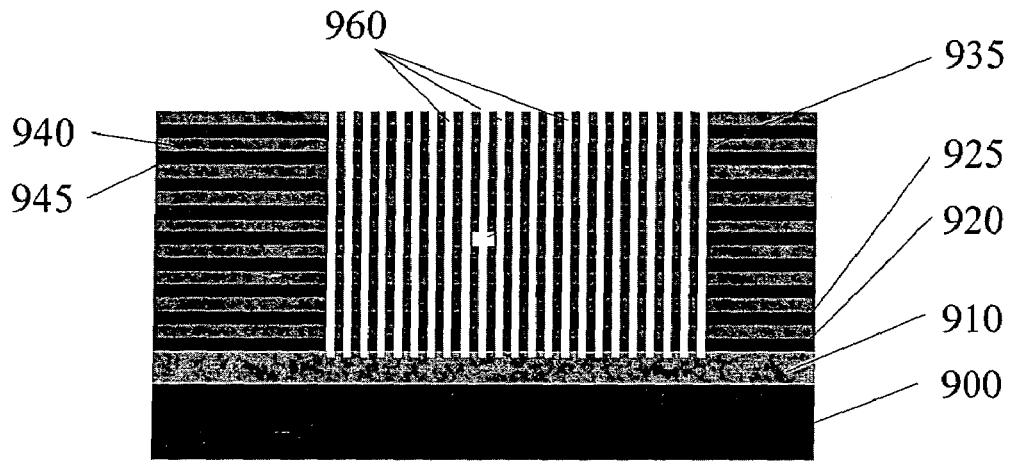

Silicon is selected as substrate material, which is indicated at 900 in FIG. 21 a), FIG. 21b) and FIG. 21 c). A buffer layer is formed by thermal oxidation of the substrate material, which is indicated at 910. Alternating layers of silicon 920 and silicon nitride 925 are formed. A mask is deposited on top of the layered structure as indicated at 930, and the silicon nitride layer is etched. A first defect consisting of silicon dioxide is formed by thermal oxidation of the underlying silicon layer as indicated at 935 in FIG. 21 *b*). The remaining local oxidation mask is removed, and a second stack of alternating layers of silicon 940 and silicon nitride 945 is deposited. A mask is deposited on top of the layered structure as indicated at 950, and the straight passages are opened by etching through the layered structure, as indicated at 960 in FIG. 21 *c*). Etching through the first defect consisting of silicon dioxide is done by a change of etch mixture. Hereby a photonic crystal structure comprising a defective layer with a line defect is provided. The line or channel defect may e.g. comprise only air or be filled with a material of a refractive index deviating from that of the rest of the defective layer In the following, the dimensioning and application of the photonic crystal waveguide described in the figures above will be discussed in connection with a number of examples. The one-dimensional structure and the two-dimensional one combine the properties of both structures in order to allow a band gap, i.e., a frequency interval for which electromagnetic propagation is prohibited for some frequency range for a given polarisation state for some direction of propagation. By tuning the parameters of the structures, both complete polarisation independent and polarisation dependent band gaps are achievable, enabling the whole range of applications predicted by theory for purely two- and three-dimensional photonic crystal structures. In the following examples the properties of the first an aspect of the invention in the absence of defects are discussed.

EXAMPLE 1

This example concerns an aspect of the present invention with $\alpha=1°$. Said first surface is periodic and two-dimensional with the tangent plane (of said first surface) being a plane parallel to the (x, y) plane of a Cartesian coordinate system (x, y, z). Let $a_1=\Lambda_\zeta(\sqrt{3}\ x+y)/2$ and $a_2=\Lambda_\zeta(\sqrt{3}\ x-y)/2$ be two basis vectors that span the (x,y) plane characterising a two-dimensional triangular crystal lattice with lattice constant $\Lambda_\zeta$, and $a_3=\Lambda_z z$ be a third basis vector, x, y, and z being the Cartesian vectors of unit length.

Said first surface is defined as the set of points (x, y, $z=S(\zeta_1, \zeta_2)$) where $S(\zeta_1, \zeta_2)=A_\zeta \sin(2\pi\ \zeta_1/\Lambda_\zeta) \sin(2\pi\ \zeta_2/\Lambda_\zeta)-t_a/2$, where the coordinate pair $(\zeta_1,\zeta_2)$ describes the (x,y) plane in the $(a_1, a_2)$ coordinate system, $A_\zeta$ is the amplitude of the modulation, $\Lambda_\zeta$ is the period of modulation along $a_1$ or $a_2$, and where $t_a$ is the thickness of layer A of said first layered structure. The latter is made by depositing layer A with refractive index $n_a$ and thickness $t_a$ followed by layer B with refractive index $n_b$ and thickness $t_b$ in alternance. The period of this multilayer stack is $\Lambda_z=t_a+t_b$, which is the length of the unit of two layers that is repeated. In this example, the units are repeated an infinite number of times, but in reality approximately 10 to 20 units will be sufficient.

Let $a_1'=\Lambda(\sqrt{3}\ x+y)/2$ and $a_2'=\Lambda(\sqrt{3}\ x-y)/2$ be two basis vectors that span the (x,y) plane characterising said second structure with a two-dimensional triangular crystal lattice of essentially identical cylindrical passages of air holes with lattice constant $\Lambda=\Lambda_\zeta/2$ and radius $r_0$ etched through the multilayer stack (said first layered structure) along the direction of $a_3$.

The values used in this example are: $n_a=4.1$, $n_b=3.73$, $\Lambda_z/\Lambda=0.3$, $t_a/\Lambda_z=0.44$, $r_0/\Lambda=0.48$, $A_\zeta/\Lambda=\sqrt{3}/3$, and $\alpha=1°$. FIG. 8 shows the band gap dependency on the normal wavevector component for all polarisation states for this first photonic crystal structure in accordance with an aspect of the present invention in the absence of defects. The band gap is the shaded region on the figure. Electromagnetic modes with normalised frequency $\omega=\Lambda/\lambda$ and characterised with the normalised wavevector component $k_z$ are not allowed to propagate in the band gap region. The so-called air line determined by $k_z/\omega=n_m=1$ is also shown. Electromagnetic modes in the region characterised by $k_z/\omega=n_m \cos\alpha \leq n_m$ can propagate in air, while modes in the region characterised by $k_z/\omega=n_m \cos\alpha > n_m$ cannot propagate in air and are evanescent. There is a region of high omnidirectional reflectivity for fields incident upon this structure from a region filled with air. This means that modes in this region are totally reflected upon the structure back into air. The region of high omnidirectional reflectivity is close to $\omega=0.5$. For a wavelength $\lambda=1.55$ μm this gives a pitch $\Lambda=0.775$ μm, $t_a=0.1$ μm, $t_b=0.67$ μm and $r_0=0.37$ μm. This structure can be used as a perfect reflector of electromagnetic energy, a mirror. Larger regions of omnidirectional reflection are possible for certain polarisations.

If a channel defect of air is created in this structure, it will be able to guide electromagnetic energy very efficiently for certain ($\omega$, $k_z$) modes and suppress radiation losses substantially allowing a multitude of advanced all-optical functions in this novel waveguide.

EXAMPLE 2

This example concerns an aspect of the present invention in the case where said first surface is planar and the intersecting angle of the second structure $\alpha=35.26°$. In the following the (x,y) plane of a Cartesian coordinate system (x, y, z) is set parallel to the surface. A layered structure is formed by depositing layer A with refractive index $n_a$ and thickness $t_a$ followed by layer B with refractive index $n_b$ and thickness $t_b$ in alternance. The period of this multilayer stack is $\Lambda_z=t_a+t_b$, which is the length of the unit of two layers that is repeated. In this example, the units are repeated an infinite number of times, but in reality approximately 10 to 20 units will be sufficient.

Let (x', y', z') be a second Cartesian coordinate system where the z'-axis and the z-axis intersect at the angle $\alpha$, and let $a_1=\Lambda(\sqrt{3}\ x+y)/2$ and $a_2=\Lambda(\sqrt{3}\ x-y)/2$ be two basis vectors that span the (x,y) plane characterising a two-dimensional triangular crystal lattice with lattice constant $\Lambda$, and $a_3=\Lambda_z (z+\tan(\alpha)y)$ be a third basis vector, x, y, and z being the Cartesian vectors of unit length. Said second structure with a two-dimensional triangular crystal lattice L of essentially identical cylindrical passages of air holes is perpendicular to said second surface which is the (x',y') plane, and is etched through the multilayer stack (said first layered structure) along the direction of $a_3$. The two-dimensional lattice formed by the intersection of the lattice L with planes perpendicular to the z-axis has a lattice constant $\Lambda$ and radius $r_{0A}$ in layer A and radius $r_{0B}$ in layer B.

The values used in this example are: $n_a=4.1$, $n_b=3.73$, $\Lambda_z/\Lambda=0.3$, $t_a/\Lambda_z=0.5$, $r_{0A}/\Lambda=0.42$, $r_{0B}/\Lambda=0.48$, and $\alpha=35.26°$. FIG. 9 shows the band gap dependency on the normal wavevector component $k_{z'}$ for all polarisation states for this second photonic crystal structure in accordance with an aspect of the present invention in the absence of defects. The band gap is the shaded region on the figure. Electromagnetic modes with normalised frequency $\omega=\Lambda/\lambda$ and characterised with the normalised wavevector component $k_{z'}$ are not allowed to propagate in the band gap region. The so-called air line determined by $k_z/\omega=n_m=1$ is also shown. Electromagnetic modes in the region characterised by $k_z/\omega=n_m$ $\cos\alpha < n_m$ can propagate in air, while modes in the region characterised by $k_z/\omega = n_m \cos\alpha > n_m$ cannot propagate in air and are evanescent.

There is a large region of omnidirectional reflectivity ($0.4865 < \omega < 0.5115$ approximately) for fields incident upon this structure from a region filled with air. This region corresponds for a wavelength of 500 nm to a pitch in the range $0.24\,\mu m < \Lambda < 0.26\,\mu m$ and corresponding thickness and hole radius. This means that modes in this region are totally reflected upon the structure back into air. This structure can be used as a perfect reflector of electromagnetic energy, a mirror. Larger regions of omnidirectional reflection are possible for certain polarisations.

If a channel defect of air is created in this structure, it will be able to guide electromagnetic energy very efficiently for certain ($\omega$, $k_z$) modes and suppress radiation losses substantially allowing a multitude of advanced all-optical functions in this novel waveguide.

EXAMPLE 3

This example concerns an aspect of the present invention in the case where the first surface is planar and the intersecting angle of the second structure $\alpha = 0°$. In the following the (x,y) plane of a Cartesian coordinate system (x, y, z) is set parallel to the surface. A layered structure is formed by depositing layer A with refractive index $n_a$ and thickness $t_a$ followed by layer B with refractive index $n_b$ and thickness $t_b$ in alternance. The period of this multilayer stack is $\Lambda_z = t_a + t_b$, which is the length of the unit of two layers that is repeated. In this example, the units are repeated an infinite number of times, but in reality approximately 10 to 20 units will be sufficient.

Let (x', y', z') be a second Cartesian coordinate system where the z'-axis and the z-axis intersect at an angle $\alpha$, and let $a_1 = \Lambda(\sqrt{3}\,x+y)/2$ and $a_2 = \Lambda(\sqrt{3}\,x-y)/2$ be two basis vectors that span the (x,y) plane characterising a two-dimensional triangular crystal lattice with lattice constant $\Lambda$, and $a_3 = \Lambda_z (z+\tan(\alpha)y)$ be a third basis vector, x, y, and z being the Cartesian vectors of unit length. Said second structure with a two-dimensional triangular crystal lattice L of essentially identical cylindrical passages of air holes is perpendicular to said second surface which is the (x',y') plane, and is etched through the multilayer stack (said first layered structure) along the direction of $a_3$. The two-dimensional lattice formed by the intersection of the lattice L with planes perpendicular to the z-axis has a lattice constant $\Lambda$ and radius $r_0$. The values used in this example are: $n_a = 4.6$, $n_b = 4.1$, $\Lambda_z/\Lambda = 0.5$, $t_a/\Lambda_z = 0.8$, $r_0/\Lambda = 0.475$, and $\alpha = 0°$. FIG. 10 shows the band gap dependency on the normal wavevector component $k_z$ for all polarisation states for this third photonic crystal structure in accordance with an aspect of the present invention in the absence of defects. The band gap is the shaded region on the figure. Electromagnetic modes with normalised frequency $\omega = \Lambda/\lambda$ and characterised with the normalised wavevector component $k_z$ are not allowed to propagate in the band gap region. Two so-called dielectric lines determined by $k_z/\omega = n_m$ are also shown ($n_m = 1$ for air, and $n_m = 1.46$ for silica). Electromagnetic modes in the region characterised by $k_z/\omega = n_m \cos\alpha < n_m$ can propagate in the pure bulk dielectric with refractive index $n_m$, while modes in the region characterised by $k_z/\omega = n_m \cos\alpha > n_m$ cannot propagate in that bulk dielectric and are evanescent. There is a large region of omnidirectional reflectivity ($0.375 < \omega < 0.425$ approximately) for fields incident upon this structure from a region filled with air. At a wavelength $\lambda = 2.5\,\mu m$ this corresponds to a large omnidirectional reflectivity for all pitches in the interval $0.94 < \Lambda < 1.06$. This means that modes in this region are totally reflected upon the structure back into air. This structure can be used as a perfect reflector of electromagnetic energy, a mirror. If a channel defect of air is created in this structure in accordance with the invention, it will be able to guide electromagnetic energy very efficiently for certain ($\omega$, $k_z$) modes and suppress radiation losses substantially allowing a multitude of advanced all-optical functions in such a waveguide.

EXAMPLE 4

This example concerns an aspect of the present invention in the case where the first surface is planar and the intersecting angle of the second structure $\alpha = 0°$. The structure is a plurality of essentially identical cylindrical pillars arranged in air in a two-dimensional periodic triangular lattice with lattice constant $\Lambda$ and radius $r_0$. The structure is perpendicular to the (x,y) plane of a Cartesian coordinate system (x,y,z). Each pillar is parallel to the z-axis and is cut out of a layered structure with a one-dimensional periodic refractive index variation along the direction perpendicular to the surface. The layered structure is formed by depositing layer A with refractive index $n_a$ and thickness $t_a$ followed by layer B with refractive index $n_b$ and thickness $t_b$ in alternance. The period of this multilayer stack is $\Lambda_z = t_a + t_b$, which is the length of the unit of two layers that is repeated. In this example, the units are repeated an infinite number of times, but in reality approximately 10 to 20 units will be sufficient.

The values used in this example are: $n_a = 2.1$, $n_b = 1.46$, $\Lambda_z/\Lambda = 0.5$, $t_a/\Lambda_z = 0.8$, $r_0/\Lambda = 0.18$. FIG. 11 shows the band diagram for all polarisation states for this photonic crystal structure in accordance with an aspect of the present invention in the absence of defects. The eigenstates can be characterised into z-even modes (TE-like) and z-odd modes (TM-like). There is a band gap ($0.4771 < \omega < 0.55677$ approximately) for z-odd modes in this structure.

If a channel defect of air is created in this structure in accordance an aspect of the invention, it will be able to guide electromagnetic energy very efficiently for certain ($\omega$, $k_z = 0$) modes and suppress radiation losses substantially allowing a multitude of advanced all-optical functions in such a waveguide.

EXAMPLE 5

An example of a planar photonic crystal waveguide is shown in FIG. 4. In the present example, the one-dimensional structure is built of alternating layers of silicon nitride and silicon. Each layer has a homogeneous refractive index $n_{Si3N4}$ and $n_{Si}$ respectively. $\Lambda_z$ is the period of the refractive index variation along the direction perpendicular to the layers, while $t_{Si3N4}$ and $t_{Si}$ are the layer thickness of the silicon nitride and the silicon layer respectively, such that $t_{Si3N4} + t_{Si} = \Lambda_z$. Furthermore, the two-dimensional structure is made of cylindrical passages with radius $r_0$ perpendicular through the layer structure distributed in a triangular lattice with a lattice constant of $\Lambda_{xy}$ and filled with air.

A band diagram for the described structure in the absence of defects is shown in FIG. 16 a) and FIG. 16 b) where $\Lambda_{xy} = \Lambda_z$. Here the radius of the through holes is $r_0/\Lambda_{xy} = 0.36$ with $t_{Si3N4}/\Lambda_z = t_{Si}/\Lambda_z = 0.5$. FIG. 16 shows that there is a wide and full band gap for a primary polarisation state P1a. This structure is an omnidirectional photonic potential barrier for the P1a states at wavelengths in the band gap, in which there is no P1a state. The full P1a gap extends approximately from $0.2637 < \Lambda_z/\lambda < 0.3773$, i.e., a 35.44% gap relative to the midgap value $\Lambda_z/\lambda=0.3205$. This yields with $\lambda=1.55$ µm a $\Lambda_z=0.3205\cdot\lambda=0.5$ µm and $t_{Si3N4}=t_{Si}=0.5\cdot\Lambda=0.25$ µm. A full P1a gap corresponds to 1.325 µm<$\lambda$<1.896 µm.

There is also a band gap for the other main polarisation state P2a propagating along the direction perpendicular to the layers. Some P2a modes can propagate along the layer plane in few discrete directions. The partial P2a gap extends approximately from 0.23<$\Lambda_{xy}/\lambda$<0.27, i.e., a 16% partial gap relative to the mid gap value $\Lambda_{xy}/\lambda=0.25$. This leads to $\Lambda_{xy}=0.25\cdot\lambda=0.39$ µm, and yields a hole diameter of $d_0=2\cdot r_0=0.72\cdot\Lambda_{xy}=0.28$ µm. The partial gap corresponds to 1.444 µm<$\lambda$<1.696 µm.

EXAMPLE 6

The complementary structure to the one of example 5 is made of a crystal lattice of cylindrical pillars. The example of a triangular structure is shown in FIG. 18. Each pillar is made of a sequence of alternating cylindrical layers consisting of silicon nitride and silicon. The axes of these pillars are perpendicular to the substrate surface. They are placed in a low dielectric background with refractive index $n_c$. In this example this background refractive index is assumed to be air. By use of this structure it is possible to interchange the characteristics of the two polarised states P1a and P2a from example 5. FIG. 19 shows band diagrams for the structure in the absence of defects with $r_0/\Lambda_{xy}=0.2$, $\Lambda_z=\Lambda_{xy}$ and $t_{Si3N4}/\Lambda_z=t_{Si}/\Lambda_z=0.5$. There is a wide and full band gap for a secondary polarisation state P2a. This structure is an omnidirectional photonic potential barrier for the P2a states at wavelengths in the band gap, in which there is no P2a state. The P2a gap extends approximately from 0.3559<$\Lambda_z/\lambda$<0.4759, i.e., a 28.85% gap relative to the mid gap value $\Lambda_z/\lambda=0.4159$. There is also a band gap for the other main polarisation state P1a propagating along the direction perpendicular to the substrate surface. Some P1a modes can propagate along the plane parallel to the substrate in few discrete directions. The partial P1a gap is larger for smaller $r_0/\Lambda_{xy}$ values.

EXAMPLE 7

This example shows that a complete omnidirectional band gap exists for all polarisation states in the structure in accordance with an aspect of the present invention in the absence of defects. Here a band diagram for the structure is shown in FIG. 22 *a*) and FIG. 22 *b*).

The structure is built of alternating planar layers of silicon nitride and silicon. Each layer has a homogeneous refractive index $n_{Si3N4}$ and $n_{Si}$ respectively. $\Lambda_z$ is the period of the refractive index variation along the direction perpendicular to the layers and $t_{Si3N4}$ and $t_{Si}$ are the layer thicknesses of the silicon nitride and the silicon layers, respectively, such that $t_{Si3N4}+t_{Si}=\Lambda_z$. Furthermore, the two-dimensional structure is made of cylindrical passages with radius $r_0$ perpendicular through the layer structure distributed in a triangular lattice with a lattice constant of $\Lambda_{xy}$ and filled with air. Band diagrams of the described structure in the absence of defects are shown in FIG. 22 *a*) for in-plane propagation and in FIG. 22 *b*) for out of plane propagation. The radius of the through holes $r_0/\Lambda_{xy}=0.475$ is kept constant while the consequence of different relative silicon nitride layer thicknesses is shown in FIG. 10 *a*). $\Lambda_z=\Lambda_{xy}$ and with $t_{Si3N4}/\Lambda_z=0.15$, $t_{Si3N4}/\Lambda_z=0.5$ and $t_{Si3N4}/\Lambda_z=0.7$.

A two-dimensional complete omnidirectional band gap is obtained for all polarisation states for $t_{Si3N4}/\Lambda_z=0.15$ and $t_{Si}/\Lambda_z=0.85$. The band gap exists for 0.4777<$\Lambda_z/\lambda$<0.4759, i.e., a 8.92% gap relative to the midgap value $\Lambda_z/\lambda=0.5$. The thin low index layer and the multilayer periodicity ensure the full polarisation independent two-dimensional band gap. Very few modes are allowed to propagate along the z-axis, and high omnidirectional reflectivity is secured.

FIG. 22 *b*) represents out of plane band diagrams for the structure. The bands are fairly linear meaning that interesting guiding properties in line defects of air holes can be achieved. Large partial gaps are obtainable and it is also clear that larger $\Lambda_z/\Lambda_{xy}$ values lead to a more dense mode distribution with higher effective refractive indices under the light line defined by $n_{eff}=k_z\lambda//\Lambda_{xy}=1$ in normalised form. Very high omnidirectional reflectivity is present as opposed to the case of the classical silica optical fibres and that of the silica photonic crystal fibres.

The structures described in the examples enable the design of compact and efficient filters, resonant cavities, closely spaced photonic waveguides, planar photonic traps, channel photonic traps, and point defects or quantum dots. The structures presented represent basic building blocks for a high-density integrated optics platform for telecommunications and advanced optical signal processing in general.

Although the invention is explained in connection with specific examples and embodiments, there is nothing to prevent the manufacture of further embodiments within the scope of the patent claims. This, for example, in connection with a design of an extremely compact coupler where a channel defect perpendicular to the layer structure is connected to a channel defect in the plane of the layered structure through a resonant cavity.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method for the manufacture of a planar photonic crystal for the control of electromagnetic waves, comprising the following steps:
    a) providing a substrate material;
    b) providing said substrate material with a specific surface topology;
    c) forming first alternating layers having different refractive indices;
    d) forming a defect;
    e) forming second alternating layers having different refractive indices; and
    f) applying an etching mask to a top of said second alternating layers and etching passages fully or partially through said layers at an angle α by use of anisotropic etching;
    wherein at least some of said first alternating layers and said second alternating layers are formed by a vapour deposition technique or by sputtering.

2. The method according to claim 1, further comprising, between steps b) and c), the step of exposing the substrate to a thermal oxidation.

3. The method according to claim 1, wherein said step of etching passages by anisotropic etching is performed according to at least one of reactive ion etching, reactive ion beam etching or ion beam sputtering.

4. The method according to claim 1 wherein all of said first alternating layers, said defect and said second alternating layers are formed by a vapour deposition technique or by sputtering.

5. The method according to claim 1, wherein in step a) a silicon substrate is selected as substrate material.

6. The method according to claim 1 wherein in step a) a glass substrate is selected as substrate material.

7. The method according to claim 1, wherein in at least one of said steps c) and e), the alternating layers are of silicon and silicon nitride formed by use of low pressure chemical vapour deposition.

8. The method according to claim 1, wherein in at least one of said steps c) and e), the alternating layers are of silicon-rich silicon nitride and silicon nitride formed by use of low pressure chemical vapour deposition.

9. The method according to claim 1 wherein the defect is formed by plasma enhanced chemical vapour deposition of silicon dioxide.

10. The method according to claim 1, wherein step f) applies a mask to the top of the layered structure and a defect is formed through the mask pattern by etching through a silicon nitride layer followed by an exposure to a thermal oxidation.

11. The method according to claim 1, wherein following step f) a coating of the straight passages is formed by use of low pressure chemical vapour deposition of silicon nitride.

12. An integrated photonic crystal structure for the control of electromagnetic waves comprising:
  a substrate material provided with a specific surface topology;
  first alternating layers having different refractive indices formed on said substrate material;
  second alternating layers having different refractive indices formed on top of said first alternating layers;
  a defect formed between said first alternating layers and said second alternating layers;
  passages formed by applying an etching mask to a top of said second alternating layers and etching said passages from said top fully or partially through said layered structure at an angle α to a plane defined by said layered structure by use of anisotropic etching; and
  at least some of said first alternating layers and said second alternating layers being formed by a vapour deposition technique or by sputtering.

13. The integrated photonic crystal structure according to claim 12, wherein said structure further comprises:
  (a) a first layered sub-structure with a surface defining a tangent plane, and having a periodic one-dimensional refractive index variation along a direction perpendicular to the tangent plane of said surface while the refractive index remains nearly uniform parallel to said tangent plane, said layered structure enabling high omnidirectional reflectivity for electromagnetic radiation having a spectrum of electromagnetic modes incident from a direction perpendicular to said tangent plane of said surface;
  (b) a second sub-structure with a plurality of essentially identical straight parallel passages fully or partly penetrating said layered structure at an angle α from the direction perpendicular to said tangent plane of said surface and arranged in a two-dimensional periodic pattern, said second structure enabling a two-dimensional photonic band gap for propagation of electromagnetic radiation having a spectrum of electromagnetic modes incident from any direction in said tangent plane of said surface; and
  (c) at least one first defect in said layered sub-structure which enables an electromagnetic mode to be localised in a vicinity of said first defect, said electromagnetic radiation being confined in the direction perpendicular to said tangent plane of said surface.

14. The integrated photonic crystal structure according to claim 13, wherein said structure further comprises at least one second defect in said second sub-structure which enables an electromagnetic mode to be localised in the vicinity of said second defect.

15. The integrated photonic crystal structure according to claim 12 wherein said layers are amorphous or poly-crystalline.

16. The integrated photonic crystal structure according to claim 12 wherein said surface is planar within processing tolerances.

17. The integrated photonic crystal structure according to claim 13 wherein said one-dimensional periodic refractive index variation along the direction perpendicular to said tangent plane of said surface is configured as a periodic dielectric structure with periodic units each having two or more layers, and that said periodic units are repeated at least twice.

18. The integrated photonic crystal structure according to claim 13 wherein the first defect of said layered substructure is defined by a region of said layered sub-structure breaking the symmetry by a change in thicknesses and/or refractive indices.

19. The integrated photonic crystal structure according to claim 13 wherein said layered sub-structure and/or said first defect includes materials selected among the group consisting of silicon dioxide, germanium doped silicon dioxide, titanium doped silicon dioxide, silicon oxy-nitride, silicon nitride, titanium oxide and silicon.

20. The integrated photonic crystal structure according to claim 13, wherein a second defect of said second sub-structure is formed through a different size, different shape or different refractive index of one or more of said passages or by the absence of one or more of said passages.

21. The integrated photonic crystal structure according to claim 13 wherein said straight parallel passages extend from the surface of the first layered sub-structure.

22. The integrated photonic crystal structure according to claim 13, wherein said surface is textured in a shape selected among a one-dimensional sinusoidal variation with period and amplitude comparable to or shorter than the wavelength of radiation, or a two-dimensional sinusoidal variation in two different directions with periods and amplitudes comparable to or shorter than the wavelength of radiation.

23. The integrated photonic crystal structure according to claim 12, wherein said passages are filled with a material selected among the group consisting of air, nitrogen, boron doped silica glass, and phosphor doped silica glass.

24. The integrated photonic crystal structure according to claim 13, wherein some of said defects form an adiabatic taper for coupling electromagnetic radiation between said first and second defects or between said defects and optical fibres or conventional planar waveguides.

25. The integrated photonic crystal structure according to claim 13 wherein said first defect or a region in the vicinity thereof includes a non-linear material.

26. The integrated photonic crystal structure according to claim 13 wherein said second defect or a region in the vicinity thereof includes a non-linear material.

27. The integrated photonic crystal structure according to claim 13, wherein said two-dimensional periodic pattern is distributed in a hexagonal structure with a pattern spacing of approximately one half wavelength of said electromagnetic radiation.

28. The integrated photonic crystal structure according to claim 13, wherein said plurality of essentially identical straight parallel passages touch each other thereby forming a plurality of essentially identical straight pillars arranged in a two-dimensional periodic pattern.

29. The integrated photonic crystal structure according to claim 13, further comprising a third sub-structure with a plurality of essentially identical straight parallel passages fully or partly penetrating said layered structure at an angle β from the direction perpendicular to said tangent plane of said surface and at an angle φ from said straight parallel passages of said second sub-structure, and arranged in said two dimensional periodic pattern common to both the second and third sub-structure, said third sub-structure enabling a two-dimensional photonic band gap for propagation of radiation having a spectrum of electromagnetic modes incident from any direction in said tangent plane of said surface.

30. The integrated photonic crystal structure according to claim 13, wherein a wavelength of said electromagnetic waves is in a range from about 190 nm to about 11 μm.

31. The integrated photonic crystal structure according to claim 12, the structure further comprising:

a first sub-structure with a plurality of essentially identical straight parallel pillars formed on a substrate, said substrate defining a tangent plane, said pillars forming an angle a with a direction perpendicular to said tangent plane, said pillars being arranged in a two-dimensional periodic pattern, said first sub-structure exhibiting a two-dimensional photonic band gap for propagation of radiation having a spectrum of electromagnetic modes incident from any direction in said tangent plane of said surface;

said pillars including a second layered sub-structure having a periodic one-dimensional refractive index variation along a direction perpendicular to the tangent plane of said surface while remaining nearly uniform parallel to said surface, said layered structure exhibiting high omnidirectional reflectivity for radiation having a spectrum of electromagnetic modes incident from the direction perpendicular to said tangent plane of said surface; and at least one first defect in said first sub-structure which enables an electromagnetic mode to be localised in the vicinity of said first defect.

32. The integrated photonic crystal structure according to claim 31, further comprising at least one second defect in said second layered sub-structure which enables an electromagnetic mode to be localised in a vicinity of said second defect, said electromagnetic radiation being confined in the direction perpendicular to said tangent plane of said surface.

33. The integrated photonic crystal structure according to claim 12, wherein said angle a is zero degrees from a direction perpendicular to said top of said second alternating layers.

34. The integrated photonic crystal structure according to claim 12, wherein said angle a is different from zero degrees.

* * * * *